(12) United States Patent
Komiya et al.

(10) Patent No.: US 7,024,079 B2
(45) Date of Patent: Apr. 4, 2006

(54) OPTICAL WAVEGUIDE MODULE

(75) Inventors: Takeo Komiya, Yokohama (JP); Takashi Sasaki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 51 days.

(21) Appl. No.: 10/483,817

(22) PCT Filed: May 14, 2003

(86) PCT No.: PCT/JP03/06021

§ 371 (c)(1),
(2), (4) Date: Jan. 15, 2004

(87) PCT Pub. No.: WO03/098293

PCT Pub. Date: Nov. 27, 2003

(65) Prior Publication Data

US 2004/0179785 A1  Sep. 16, 2004

(30) Foreign Application Priority Data

May 15, 2002  (JP) ............................ P2002-140520
May 15, 2002  (JP) ............................ P2002-140526

(51) Int. Cl.
*G02B 6/30*   (2006.01)

(52) U.S. Cl. ............................ 385/49; 385/14; 385/48; 385/129

(58) Field of Classification Search .................. 385/49, 385/31, 47, 48, 14, 88, 89, 129
See application file for complete search history.

(56) References Cited

U.S. PATENT DOCUMENTS 6,406,196 B1 * 6/2002 Uno et al. ..................... 385/89
6,850,674 B1 * 2/2005 Haraguchi et al. ............. 385/49
2003/0044119 A1 * 3/2003 Sasaki et al. .................. 385/49
2004/0042728 A1 * 3/2004 Ito et al. ........................ 385/49
2005/0117831 A1 * 6/2005 Komiya et al. ................ 385/14

FOREIGN PATENT DOCUMENTS

JP   2002-182051   6/2002
WO  WO 97/06458   2/1997

OTHER PUBLICATIONS

Year 2002, General Meeting of The Institute of Electronics, Information and Communication Engineers, C-3-49.
Takashi Sasaki et al., "Kogata Tahacho Shingo Kyodo Monitor No Kaihatsu", 2001 nen The Institute of Electronics, Information and Communication Engineers Sogo Taikai Koen Ronbunshu, Mar. 7, 2001, Electronics 1, p. 251.
T. Sasaki et al., Multi-Channel Power Level Monitor with Upward-Reflector and Sensor-Array Integrated in Planar Lightwave Circuit, Technical Digest of Optical Fiber Communication Conference, 2001 (OFC 2001), Mar. 17-22, 2001, vol. 3, p. WB6-1-WB6-3.

* cited by examiner

*Primary Examiner*—Sung Pak
(74) *Attorney, Agent, or Firm*—McDermott Will & Emery LLP

(57) ABSTRACT

In a planar-waveguide-type optical circuit 1, a reflection filter 4 is placed inside an oblique groove 3 formed to traverse optical waveguides $2_n$. Reflected light from the reflection filter 4 is detected by photodetectors $61_n$ of a photodetector array 6, and thereby light intensity of signal light is monitored. A glass substrate made of glass material having a refractive index substantially identical to that of a core 20 of the optical waveguide $2_n$ and filter fixing resin 5 fixing the reflection filter 4 is used for a substrate 10 of the optical circuit 1 constituting part of the groove 3. This inhibits reflection of light in various regions of the groove 3, thereby reducing generation of extra scattered light inside the groove 3 and its confinement. An optical waveguide module capable of enhancing monitoring characteristics of the signal light is thus realized.

5 Claims, 20 Drawing Sheets

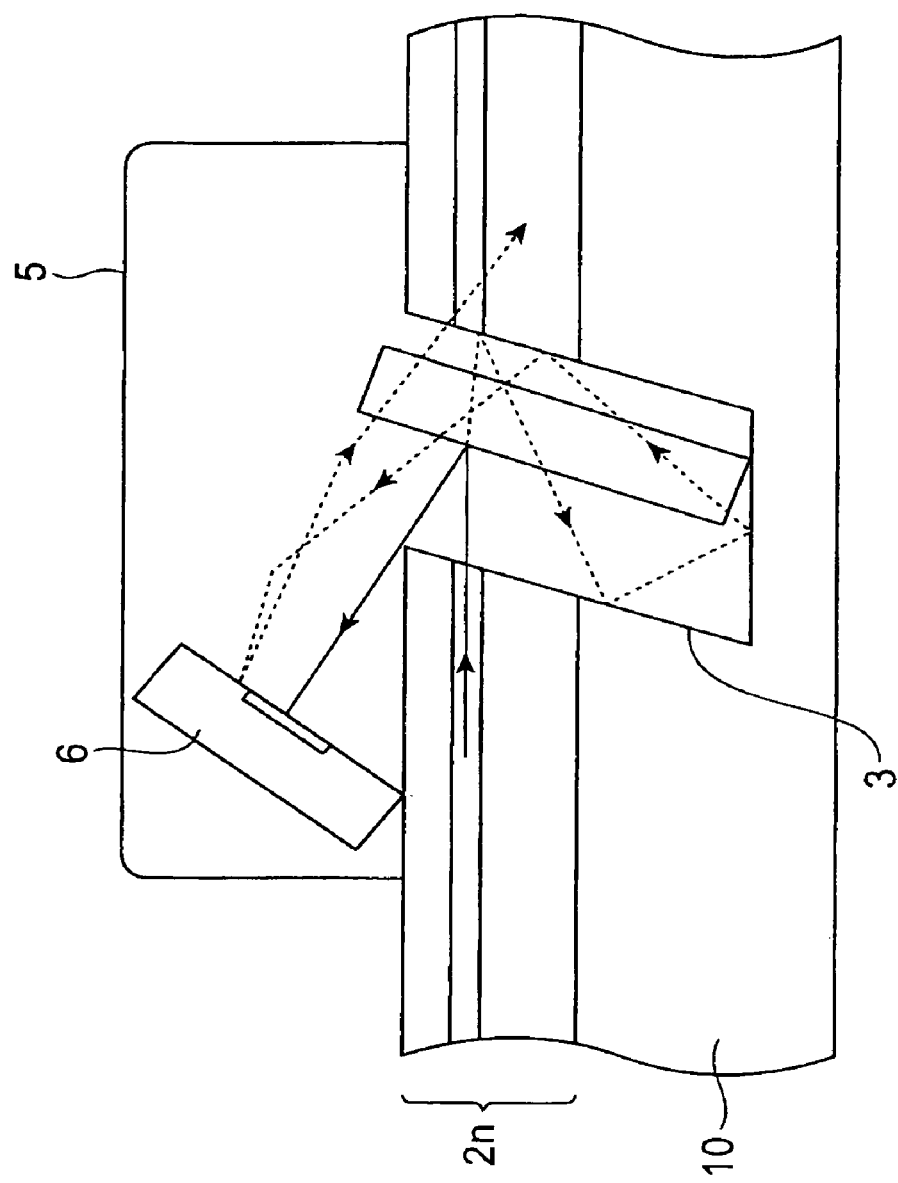

OPTICAL WAVEGUIDE MODULE

TECHNICAL FIELD

The present invention relates to an optical waveguide module having optical waveguides provided on its substrate.

BACKGROUND ART

For some optical circuits using optical waveguides such as optical fibers or planar optical waveguides, it may be desirable to keep constant the light intensity of signal light transmitted in each optical waveguide, or otherwise adjust the light intensity of the signal light to a suitable value. In such a case, the light intensity of the signal light is monitored in the optical circuit, or additionally the monitored result is used as a basis for controlling the light intensity.

DISCLOSURE OF INVENTION

For monitoring the light intensity of the signal light as described above, a method is conventionally used in which an optical coupler is provided along the optical waveguide to split part of the signal light. In this method, an optical coupler is provided at a predetermined position along the optical waveguide to split about a few percent of the signal light. The light intensity of the split light is monitored by a photodetector, and thereby the light intensity of the signal light transmitted in the optical waveguide is monitored. Here, when an optical coupler is used as just described, the number of optical components constituting the optical circuit increases, and further they needs to be fusion spliced. This causes a problem of making the configuration and manufacturing process of the optical circuit more complex.

On the contrary, another method of monitoring light intensity has been proposed, which draws part of signal light by reflection without using optical couplers. One such device is described in, for example, Kasahara et al., "PLC hybrid integrated-type 8ch tapped optical power monitor", the 2002 General Conference of the Institute of Electronics, Information and Communication Engineers, C-3-49.

In this device, the signal light is propagated in a planar-waveguide-type optical waveguide. A multilayer film filter is inserted inside a groove formed in the planar-waveguide-type optical circuit to reflect part of the signal light. The signal light reflected by the multilayer film filter is then detected by a photodiode, and thereby the light intensity of the signal light is monitored. Also in this monitoring device, shading grooves filled with light absorbing material are formed between the multilayer film filter and the photodiode or in other predetermined regions in order to inhibit crosstalk between channels due to stray light.

However, in such a configuration where the propagated signal light is monitored by means of reflected light from the reflection filter, there is a problem that inside the groove for inserting the reflection filter in the optical waveguide, extra scattered light is generated by reflection of light or otherwise at various regions. Such scattered light may cause degradation of monitoring characteristics for the signal light, such as the S/N ratio at the photodiode for detecting the reflected light from the reflection filter and the crosstalk between adjacent photodiodes.

The present invention is directed to solving the above problems. An object of the present invention is to provide an optical waveguide module capable of reducing the influence of extra scattered light, and enhancing the monitoring characteristics for the signal light.

To achieve such an object, an optical waveguide module according to the present invention comprises: (1) an optical circuit configured to include a substrate and an optical waveguide provided on the substrate, and having a groove formed to traverse a predetermined position of the optical waveguide; (2) a reflection filter, placed inside the groove of the optical circuit to span a region through which signal light propagated in the optical waveguide passes, for reflecting part of the signal light at a predetermined reflectance; (3) filter fixing resin for fixing the reflection filter by filling at least inside of the groove for seal thereof; and (4) a photodetector for detecting reflected light which is part of the signal light reflected by the reflection filter, wherein (5) the groove of the optical circuit is formed with material having a refractive index substantially identical to that of a core of the optical waveguide and the filter fixing resin with respect to the signal light having a wavelength within a predetermined signal light wavelength band.

In the optical waveguide module described above, the light intensity of the signal light is monitored by using the reflection filter inserted in the groove provided on the optical waveguide. This simplifies the configuration and manufacturing process of the optical circuit. Furthermore, the material for each region constituting the groove provided in the optical circuit for inserting the reflection filter is made with material having a refractive index substantially identical to that of the core of the optical waveguide and the filling resin inside the groove. As a result, reflection of light is inhibited at such regions as an inner wall portion of the groove formed in the optical circuit including the optical waveguide, the filter fixing resin, and their interfaces, and thereby generation of extra scattered light inside the groove is reduced. Therefore, an optical waveguide module capable of enhancing the monitoring characteristics for the signal light is obtained.

Another optical waveguide module according to the present invention comprises: (1) an optical circuit configured to include a substrate and an optical waveguide provided on the substrate, and having a groove formed to traverse a predetermined position of the optical waveguide; (2) a reflection filter placed inside the groove of the optical circuit to span a region through which signal light propagated in the optical waveguide passes, for reflecting part of the signal light at a predetermined reflectance; (3) filter fixing resin for fixing the reflection filter by filling at least inside of the groove for seal thereof; and (4) a photodetector for detecting reflected light, which is part of the signal light reflected by the reflection filter, wherein (5) the filter fixing resin is formed with resin material having a higher refractive index than that of a core of the optical waveguide with respect to the signal light having a wavelength within a predetermined signal light wavelength band.

In the optical waveguide module described above, the light intensity of the signal light is monitored by using the reflection filter inserted in the groove provided on the optical waveguide. This simplifies the configuration and manufacturing process of the optical circuit. Furthermore, the filter fixing resin filling the inside of the groove which is provided in the optical circuit and in which the reflection filter is inserted, is to be made with resin material having a higher refractive index than that of the core of the optical waveguide. As a result, scattered light generated inside the groove is actively emitted outside, and thereby confinement and diffusion of extra scattered light inside the groove are inhibited. Therefore, influence of the extra scattered light is reduced and the optical waveguide module capable of enhancing the monitoring characteristics for the signal light is obtained.

BRIEF DESCRIPTION OF DRAWINGS

FIG. 5 is a schematic view illustrating generation of scattered light in the optical waveguide module;

BEST MODE FOR CARRYING OUT THE INVENTION

Figure 1:
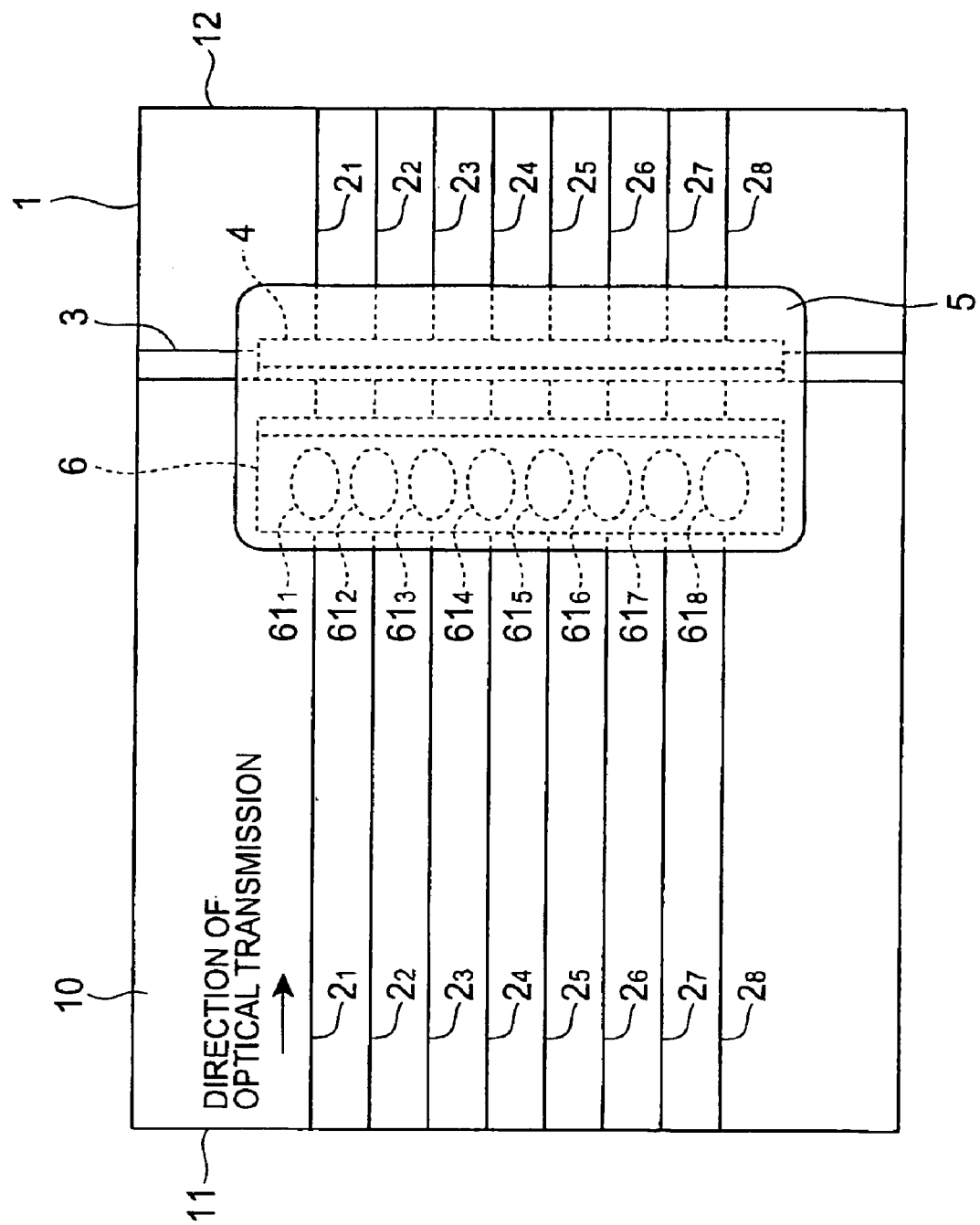
FIG. 1 is a plan view illustrating the configuration of a first embodiment of the optical waveguide module.

Preferred embodiments of the optical waveguide module according to the present invention will now be described in detail in conjunction with the drawings. In the description of the drawings, like elements are marked with like reference numerals, with duplicate description omitted. The ratio of various dimensions in the figures does not necessarily correspond to that in the description.

FIG. 1 is a plan view illustrating the configuration of a first embodiment of the optical waveguide module according to the present invention. This optical waveguide module comprises an optical circuit 1 configured to have a substrate 10 and eight (eight channels of) optical waveguides $2_1$–$2_8$ provided on the substrate 10. The present embodiment uses planar-waveguide-type optical waveguides formed on the substrate 10 as the optical waveguides $2_1$–$2_8$.

Each of the optical waveguides $2_1$–$2_8$ is formed along a predetermined direction of optical transmission (in the direction of the arrow shown in FIG. 1) from an input end 11 toward an output end 12 of the planar-waveguide-type optical circuit 1, in parallel and equally spaced relative to each other. At a predetermined position along the direction of optical transmission of the planar-waveguide-type optical circuit 1, a groove 3 traversing the optical waveguides $2_1$–$2_8$ is formed.

Inside the groove 3 of the optical circuit 1, a reflection filter 4 is placed which reflects part of signal light propagated in each of the optical waveguides $2_1$–$2_8$ at a predetermined reflectance. The inside of the groove 3 is sealed with filling resin 5. At a position upstream of the groove 3 along the direction of optical transmission and on the upper surface side of the planar-waveguide-type optical circuit 1, a photodetector array 6 is placed. This photodetector array 6 has eight photodetectors $61_1$–$61_8$ corresponding to the eight optical waveguides $2_1$–$2_8$ provided in the planar-waveguide-type optical circuit 1, respectively.

Figure 2:
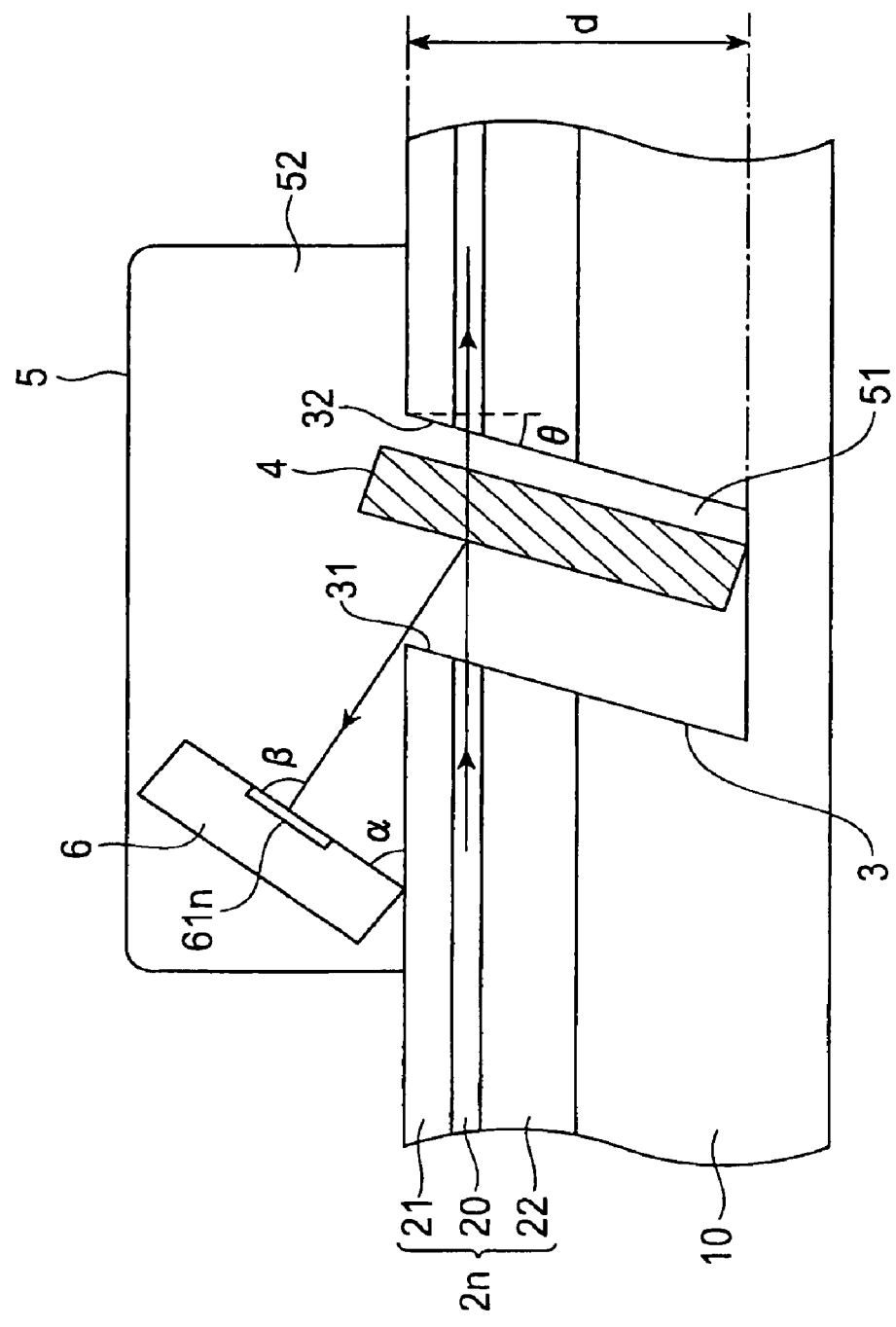
FIG. 2 is a partially enlarged cross-sectional view illustrating a cross-sectional configuration along the optical axis of the optical waveguide module shown in FIG. 1.

FIG. 2 is a cross-sectional view illustrating a cross-sectional structure of the optical waveguide module shown in FIG. 1 along the direction of the optical axis of the optical waveguide $2_n$ (n=1, . . . , 8) (the direction of optical transmission in the planar-waveguide-type optical circuit 1). In FIG. 2, a portion including the groove 3, reflection filter 4, and photodetector array 6 is shown in an enlarged form.

As shown in FIG. 2, the optical waveguides $2_n$ in the planar-waveguide-type optical circuit 1 are configured by forming a lower cladding 22, core 20, and upper cladding 21 on the substrate 10. The groove 3 traversing the optical waveguides $2_n$ at the predetermined position is formed at a depth d which spans at least a region, corresponding to the core 20, through which the signal light propagated in the optical waveguide $2_n$ passes. In addition, this groove 3 is formed obliquely at a predetermined tilt angle $\theta$ ($0°<\theta$) relative to the vertical axis orthogonal to the optical axis of the optical waveguide $2_n$ (orthogonal to the substrate 10).

In the present embodiment, the depth d of the groove 3 is set to be greater than the thickness of the optical waveguide $2_n$ down to the lower cladding 22, and part of a lower portion of the groove 3 is formed by removing a predetermined region of the substrate 10. Here, the inner wall portion of the groove 3 in the optical circuit 1 is composed of the core 20, claddings 21 and 22, and substrate 10.

Inside the groove 3, the reflection filter 4 is inserted. The reflection filter 4 is placed at an angle $\theta$ substantially identical to that of the groove 3 to span at least a region through which the signal light propagated in the optical waveguide $2_n$ passes. This reflection filter 4 is preferably made of a dielectric multilayer film filter, which reflects part of the signal light propagated in the optical waveguide $2_n$ having a wavelength within a predetermined signal light wavelength band at a predetermined reflectance.

At a predetermined position on the upper surface side of the upper cladding 21 of the planar-waveguide-type optical circuit 1, the photodetector array 6 is placed which has photodetectors $61_n$ (n=1, . . . , 8) each corresponding to one of the optical waveguides $2_n$. This photodetector array 6 is placed so that each reflected light, which is part of the signal light propagated in the optical waveguide $2_n$ reflected by the reflection filter 4, is incident on a light-receiving surface of the corresponding photodetector $61_n$.

In the present embodiment, the photodetector array 6 is placed so that its light-receiving surface makes an oblique angle α (0°<α<90°) relative to the upper surface of the planar-waveguide-type optical circuit 1. This angle α is preferably set so that the reflected light from the reflection filter 4 is incident on the light-receiving surface of the photodetector $61_n$ at a substantially orthogonal angle β. In the configuration example shown in FIG. 2, a front-surface-incident-type photodiode is used for the photodetector $61_n$ of the photodetector array 6. The surface of the photodetector array 6 facing the reflection filter 4 is the light-receiving surface on which the reflected light from the reflection filter 4 is incident.

The light-receiving surface of the photodetector $61_n$ is provided with an anti-reflection coating (AR coating), which is a coating film preventing reflection of light within a predetermined wavelength band corresponding to the signal light wavelength band of the signal light propagated in the optical waveguide $2_n$.

The inside of the groove 3 including the reflection filter 4 is sealed with the filling resin 5. This filling resin 5 serves as filter fixing resin for fixing the reflection filter 4 placed inside the groove 3. The filter fixing resin 5 is preferably made with resin material having a refractive index substantially identical to that of the core 20 of the optical waveguide $2_n$ through which the signal light is propagated.

The filter fixing resin 5 in the present embodiment is composed of an inner filling resin portion 51 sealing the inside of the groove 3 and an upper filling resin portion 52 sealing a predetermined range on the upper surface side of the planar-waveguide-type optical circuit 1 including the upper portion of the groove 3. The inner filling resin portion 51 and upper filling resin portion 52 are integrally formed with identical resin material. In general, the filter fixing resin is formed such that it fills at least the inside of the groove for seal thereof.

The upper filling resin portion 52 is provided in a range including at least the light-receiving surface of the photodetector array 6. As a result, between the reflection filter 4 for reflecting part of the signal light and the photodetector $61_n$ for detecting the reflected light from the reflection filter 4, the reflected light path along which the reflected light propagates is filled with the filter fixing resin 5.

Here, the groove 3 for inserting the reflection filter 4 provided in the planar-waveguide-type optical circuit 1 is formed with material having a refractive index substantially identical to that of the core 20 of the optical waveguide $2_n$ and the filter fixing resin 5 with respect to the signal light having a wavelength within the signal light wavelength band. Specifically, in the groove 3 shown in FIG. 2, which has an inner wall portion composed of the core 20, claddings 21 and 22, and substrate 10, a glass substrate made of glass material having a refractive index substantially identical to that of the core 20 of the optical waveguide $2_n$ and the filter fixing resin 5 is used for the substrate 10 constituting part of the groove 3. In general, the refractive index difference between the core 20 and the claddings 21 and 22 is sufficiently small.

In the above configuration, when the signal light of a predetermined wavelength propagated in the optical waveguide $2_n$ on the input end 11 side is emitted via an upstream end surface 31 to the inner filling resin portion 51 in the groove 3, part of the signal light is reflected obliquely upward with respect to the planar-waveguide-type optical circuit 1 at a predetermined reflectance by the reflection filter 4 placed obliquely relative to the optical axis. The other signal light components are transmitted through the inner filling resin portion 51 and reflection filter 4 and incident via a downstream end surface 32 on the optical waveguide $2_n$ at the output end 12 side.

On the other hand, the reflected light reflected by the reflection filter 4 passes through the inner filling resin portion 51 and upper filling resin portion 52 to reach the photodetector array 6, and is incident on its light-receiving surface into the photodetector $61_n$ at the predetermined incident angle β. The light intensity of the reflected light detected by the photodetector $61_n$ is then used to monitor the light intensity of the signal light propagated in the optical waveguide $2_n$.

The effect of the optical waveguide module of the present embodiment will now be described.

In the optical waveguide module shown in FIGS. 1 and 2, the signal light propagated in the optical waveguide $2_n$ provided in the optical circuit 1 is not split by an optical coupler or the like. Rather, in the configuration of the optical waveguide module, part of the signal light is reflected by the reflection filter 4 placed in the groove 3 provided on the optical waveguide $2_n$, and the reflected light can be monitored by means of the light intensity of the signal light. This simplifies the configuration and manufacturing process of the optical circuit.

Furthermore, the material for each region constituting the groove 3 provided in the planar-waveguide-type optical circuit 1 for inserting the reflection filter 4, is to be made with material having a refractive index substantially identical to that of the core 20 of the optical waveguide $2_n$ and the filter fixing resin 5 filling the inside of the groove 3. As a result, reflection of light is inhibited at such regions as the inner wall portion of the groove 3 formed in the optical circuit 1 including the optical waveguides $2_1$–$2_8$, the filter fixing resin 5, and their interfaces, and thereby generation of extra scattered light inside the groove 3 is reduced. Therefore, the optical waveguide module capable of enhancing the monitoring characteristics for the signal light is obtained.

As a specific configuration for such a groove 3, in the example presented in the above embodiment, a substrate made of material having a refractive index substantially identical to that of the core 20 of the optical waveguide $2_n$ and the filter fixing resin 5 is used for the substrate 10 constituting a portion of the groove 3. By configuring the optical circuit 1 with the substrate 10 made of such material, the groove 3 satisfying the above conditions can be readily formed in the planar-waveguide-type optical circuit 1.

The material forming the groove 3 in the optical circuit 1 is made with glass material having a refractive index substantially identical to that of the core 20 of the optical waveguide $2_n$ and the filter fixing resin 5 as the material for the substrate 10. By using glass material having good workability and being inexpensive as described above, the optical waveguide module can be fabricated at a low cost. Alternatively, material other than glass material may be used. If any member other than the substrate constitutes the groove, it is preferable to use material having a refractive index substantially identical to that of the core of the optical waveguide and the filter fixing resin as the material for such a member, as with the substrate 10 described above.

Furthermore, as shown in FIG. 2, the groove 3 formed in the optical circuit 1 is preferably formed obliquely at a predetermined tilt angle θ relative to the vertical axis orthogonal to the optical axis of the optical waveguide $2_n$. As a result, the configuration is suitably realized for monitoring the light intensity of the signal light by detecting the reflected light from the reflection filter 4 with the photodetector $61_n$. In this case, as the reflection filter 4 for reflecting part of the signal light, it is preferable to use a reflection filter which achieves polarization compensation to allow the reflectances for the two orthogonal polarizations to be substantially equal.

As an optical circuit in which optical waveguides are provided on its substrate and a groove for inserting a reflection filter is formed, FIGS. 1 and 2 show the planar-waveguide-type optical circuit 1 made with the planar-waveguide-type optical waveguides $2_n$. However, optical circuits having other configurations may be used. For example, an optical circuit configured by fixing optical fibers as optical waveguides in a fixing V-groove formed on the substrate, or an optical circuit configured with planar-waveguide-type optical waveguides in combination with optical fibers, may be used.

The configuration and effect of the optical waveguide module shown in FIGS. 1 and 2 will be described more specifically.

Figure 3A:
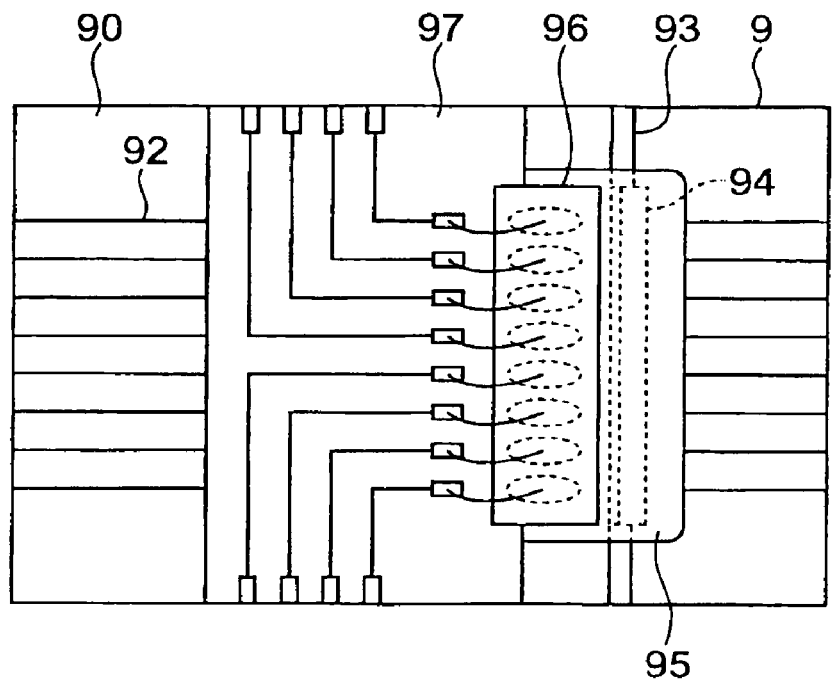
FIGS. 3A and 3B are (A) a plan view and (B) a cross-sectional view illustrating an example of the configuration of the optical waveguide module.
Figure 3B:
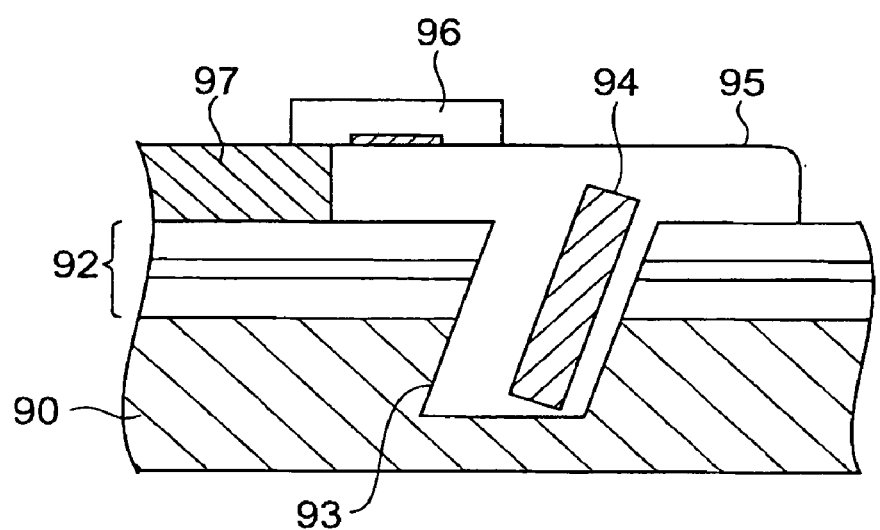

FIGS. 3A and 3B are (A) a plan view and (B) a cross-sectional view illustrating an example of the configuration of the optical waveguide module. This optical waveguide module is shown for the purpose of describing the effect of the optical waveguide module shown in FIGS. 1 and 2. The plan view of FIG. 3A and the cross-sectional view of FIG. 3B correspond to the plan view of FIG. 1 and the cross-sectional view of FIG. 2, respectively.

The optical waveguide module shown in FIGS. 3A and 3B is composed of a planar-waveguide-type optical circuit 9 in which eight planar-waveguide-type optical waveguides 92 and a groove 93 are provided on its substrate 90, a reflection filter 94 placed inside the groove 93, filter fixing resin 95, a submount substrate 97, and a photodetector array 96 placed on the filter fixing resin 95 and submount substrate 97. In the present configuration example, a Si (silicon) substrate is used for the substrate 90 of the optical circuit 9 constituting a portion of the groove 93.

Figure 4:
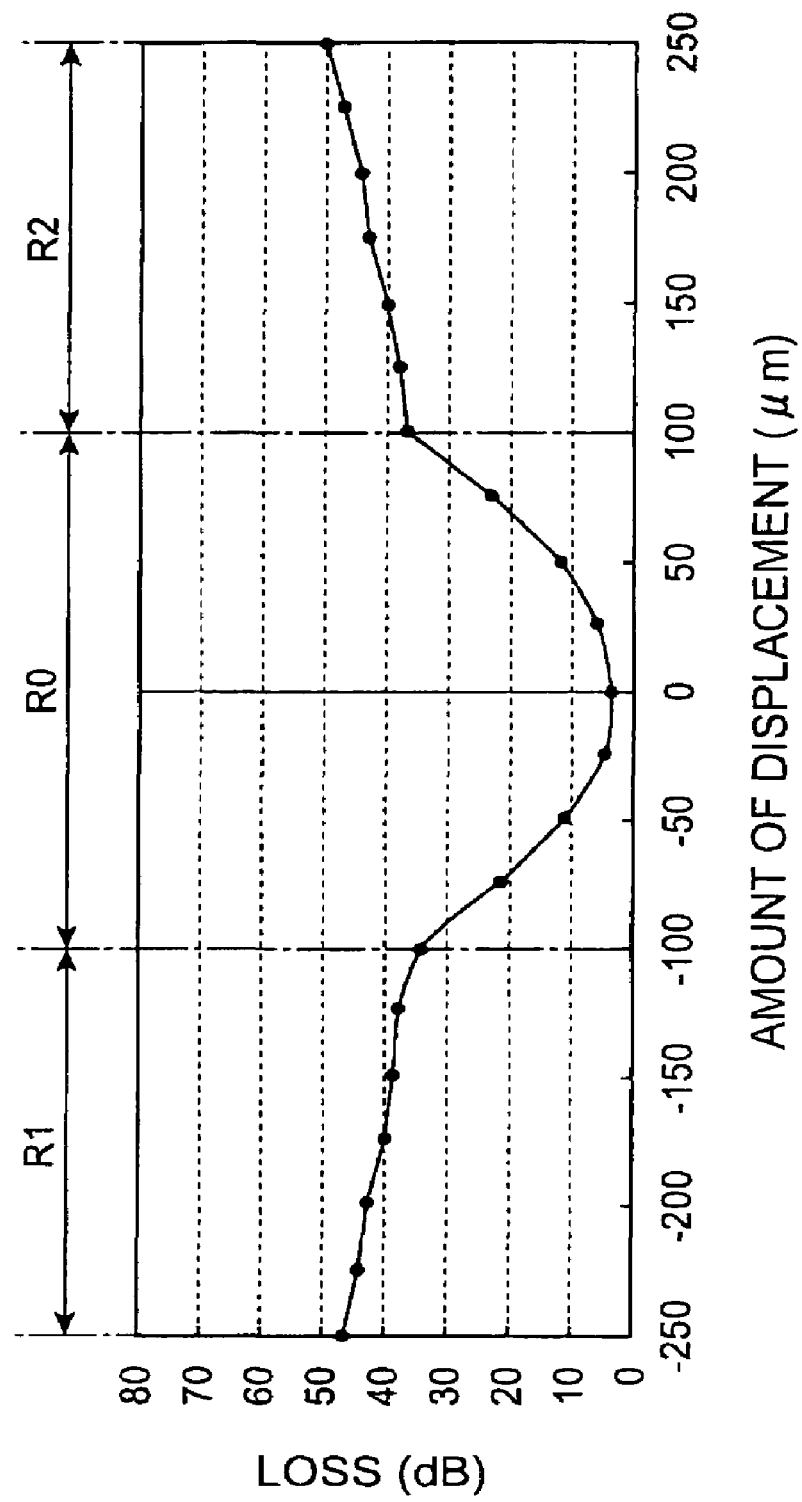
FIG. 4 is a graph illustrating a light intensity distribution in the optical waveguide module shown in FIGS. 3A and 3B.

FIG. 4 is a graph illustrating a light intensity distribution in the optical waveguide module shown in FIGS. 3A and 3B. This graph shows the spread of scattered light in the direction of the groove 93 when signal light is inputted to a particular channel in the eight-channel optical waveguide module having the above configuration.

In this graph, the horizontal axis indicates an amount of displacement (μm) in the direction of the groove from the optical waveguide of the channel to which the signal light is inputted. The vertical axis indicates the light intensity detected at each position as the photodetector is displaced in the direction of the groove, in terms of its loss (dB) where the light intensity of the inputted signal light is used as a reference.

With regard to specific conditions, the optical waveguide 92 is made with a planar-waveguide-type optical waveguide with Δn=0.4%, and the groove 93 has a width of 25 μm and a tilt of θ=10°. The reflection filter 94 is made with a polyimide substrate-based reflection filter with a thickness of 20 μm. The photodetector array 96 for detecting the reflected light is made with an eight-channel photodiode array in which front-surface-incident-type photodiodes having a light-receiving area of 120×200 μm are arranged. The distance from the reflection point at the reflection filter 94 to the light-receiving surface of the photodetector array 96 is set to 700 μm.

Referring to the graph shown in FIG. 4, in the region R0 where the amount of displacement ranges from −100 μm to 100 μm centered at the optical waveguide of the channel to which the signal light is inputted, a light intensity distribution of substantially Gaussian shape is obtained corresponding to the light intensity distribution of the signal light itself. On the other hand, in the outside regions R1 and R2, the detected light intensity does not decrease sufficiently, leaving some level of light intensity in a wide range. For example, if photodiodes of adjacent channels are spaced apart by 250 μm, the crosstalk in these channels will be on the order of 38 dB. Here, the crosstalk between channels is represented by a ratio of the light intensity detected in a channel other than the normal channel to that detected in the normal channel.

The extra residual light intensity distribution in such outside regions R1 and R2, and the resultant degradation of S/N ratio in the photodetectors, or degradation of crosstalk between adjacent channels, may be caused by generation of extra scattered light inside the groove for inserting the reflection filter. FIG. 5 is a schematic view illustrating the generation of scattered light in the optical waveguide module.

More specifically, in the optical waveguide module shown in FIGS. 3A and 3B which uses a Si substrate for the substrate of the optical circuit, the regions constituting the groove have approximately the following refractive indices, n: n=1.46 for quartz-based optical waveguides such as planar-waveguide-type optical waveguides or optical fibers; n=1.6 for the polyimide-substrate-based reflection filter; and n=3.46 for the Si substrate of the optical circuit. In such a configuration, the difference of refractive indices in various regions of the groove will cause reflection of light at their interfaces. For example, the Si substrate is substantially transparent to the signal light in the wavelength band of λ=1.55 μm used as a signal light wavelength band for communication. However, the difference of the refractive index compared to the other regions such as the filter fixing resin causes extra reflection of light at its interface.

Furthermore, in the above configuration where the inside of the groove is filled with resin for fixing the reflection filter, the scattered light generated inside the groove is reflected at the interface with the Si substrate and the like of higher refractive indices, and at the same time, as shown schematically in FIG. 5 by dashed lines, the scattered light is confined in the periphery of the reflection filter and diffused inside the groove in the direction of the groove. The scattered light inside the groove is also generated by surface roughness of the inner wall of the groove, refraction of light in the reflection filter, coupling loss caused by the signal light reentering the optical waveguide from the downstream end surface of the groove, reflection of light at the light-receiving surface of the photodetectors, and the like. Such scattered light is confined as well in the periphery of the reflection filter and diffused in the direction of the groove.

On the contrary, in the optical waveguide module shown in FIGS. 1 and 2, the optical circuit 1 is configured with the substrate 10 made of material such as glass material having a refractive index substantially identical to that of the core 20 of the optical waveguide $2_n$ and the filter fixing resin 5. In this optical circuit 1, the groove 3 for inserting the reflection filter 4 is formed.

As a result, since the difference of refractive indices at the interface of various regions of the groove 3 is reduced, the generation of extra scattered light due to reflection of light at the interface or otherwise is inhibited. The confinement of scattered light inside the groove 3, and its diffusion in the direction of the groove are inhibited as well. This results in preventing degradation of monitoring characteristics for the signal light, such as the S/N ratio at the photodetectors and the crosstalk between adjacent channels, caused by the scattered light generated inside the groove 3, thereby enhancing the monitoring characteristics.

Figure 6A:
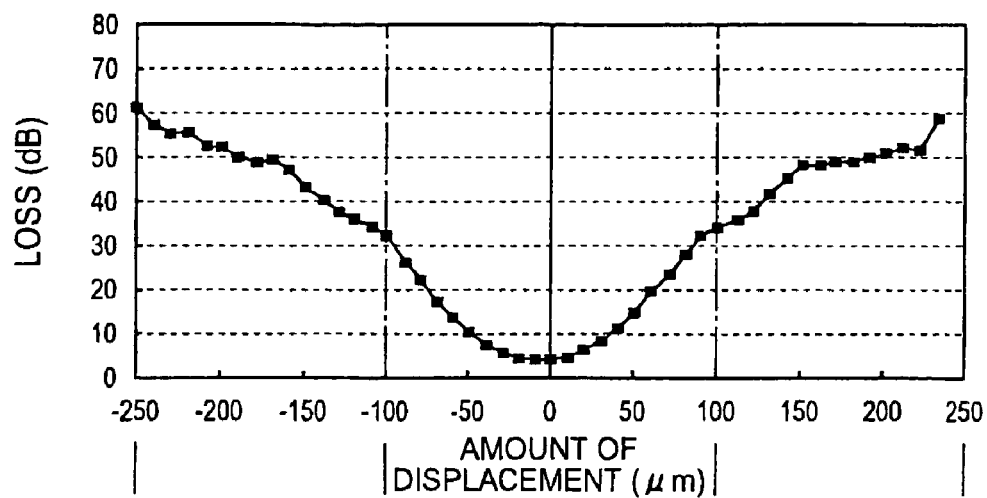
FIGS. 6A and 6B are graphs illustrating light intensity distributions in the optical waveguide module shown in FIG. 1.
Figure 6B:
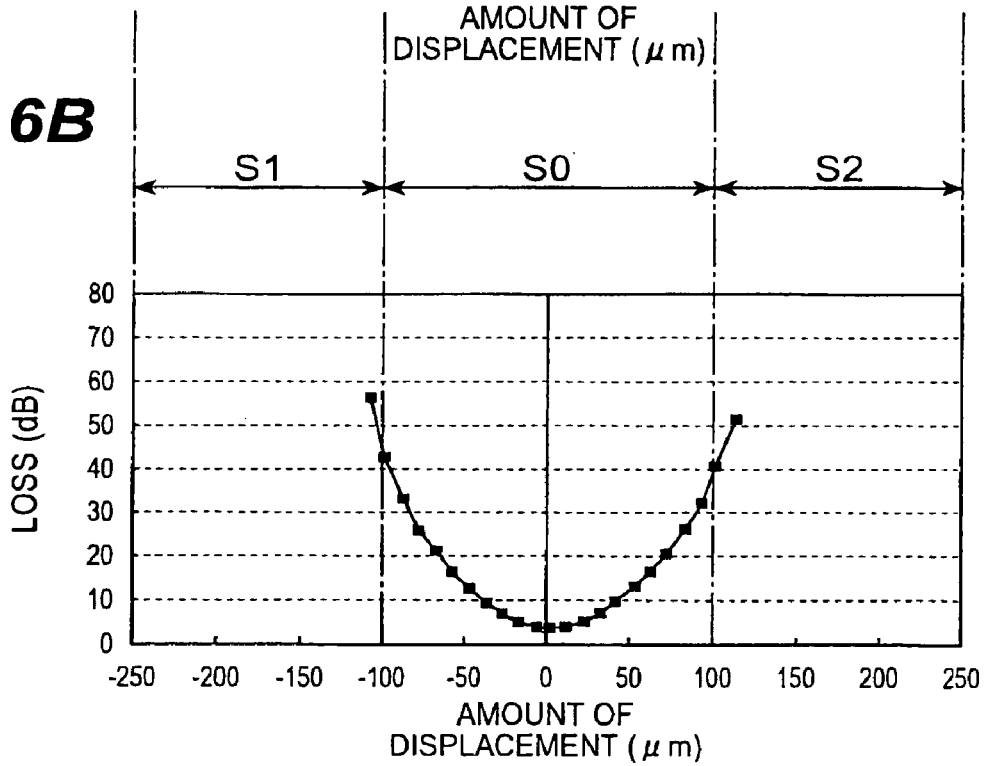

FIGS. 6A and 6B are graphs illustrating light intensity distributions in the optical waveguide module shown in FIGS. 1 and 2. Here, FIG. 6A shows a graph of a light intensity distribution where the substrate of the optical circuit in the configuration shown in FIG. 1 is replaced with a Si substrate. FIG. 6B shows a graph of a light intensity distribution where the quartz glass substrate is used as described above. Each of these graphs shows the spread of scattered light in the direction of the groove 3 when signal light is inputted to a particular channel in the eight-channel optical waveguide module having the configuration shown in FIG. 1.

In these graphs, the horizontal axis indicates an amount of displacement (μm) in the direction of the groove from the optical waveguide $2_n$ of the channel to which the signal light is inputted. The vertical axis indicates the light intensity detected at each position as the photodetector is displaced in the direction of the groove, in terms of its loss (dB) where the light intensity of the inputted signal light is used as a reference.

With regard to specific conditions, except for the Si substrate and quartz glass substrate described above, the optical waveguide module has the same configuration in each case of FIGS. 6A and 6B. The material for the filter fixing resin 5 is made with organic silicone-based resin with a refractive index n=1.48. Here, outside this filter fixing resin 5, scattered light reducing resin (not shown in FIGS. 1 and 2) made with UV acrylic resin having a refractive index of n=1.53 is provided. Regarding the optical waveguide $2_n$, reflection filter 4 and others, the conditions are the same as those described above with reference to FIG. 4.

As shown in FIG. 6A, for the optical waveguide module where a Si substrate with a high refractive index is used as the substrate constituting a portion of the groove, in the region S0 including the channel to which the signal light is inputted, a light intensity distribution of substantially Gaussian shape is obtained corresponding to the light intensity distribution of the signal light itself. On the other hand, in such a configuration, extra scattered light is generated inside the groove 3 in which the reflection filter 4 is placed, confined inside the groove 3, and diffused toward the periphery in the direction of the groove. Here, while the light intensity of the scattered light detected by the photodetector of the channel to which the signal light is inputted decreases, some level of light intensity remains in a wide range of the outside regions S1 and S2.

On the contrary, as shown in FIG. 6B, in the optical waveguide module where a quartz glass substrate having a refractive index substantially identical to that of the core 20 of the optical waveguide $2_n$ and the filter fixing resin 5 is used as the substrate constituting a portion of the groove, generation of scattered light inside the groove 3, and its confinement and diffusion in the direction of the groove are inhibited. As a result, the light intensity of the scattered light remaining in the outside regions S1 and S2 is reduced, and the crosstalk in the adjacent channels is inhibited below 40 dB. Accordingly, the monitoring characteristics for the light intensity of the signal light by the optical waveguide module are enhanced.

Figure 7:
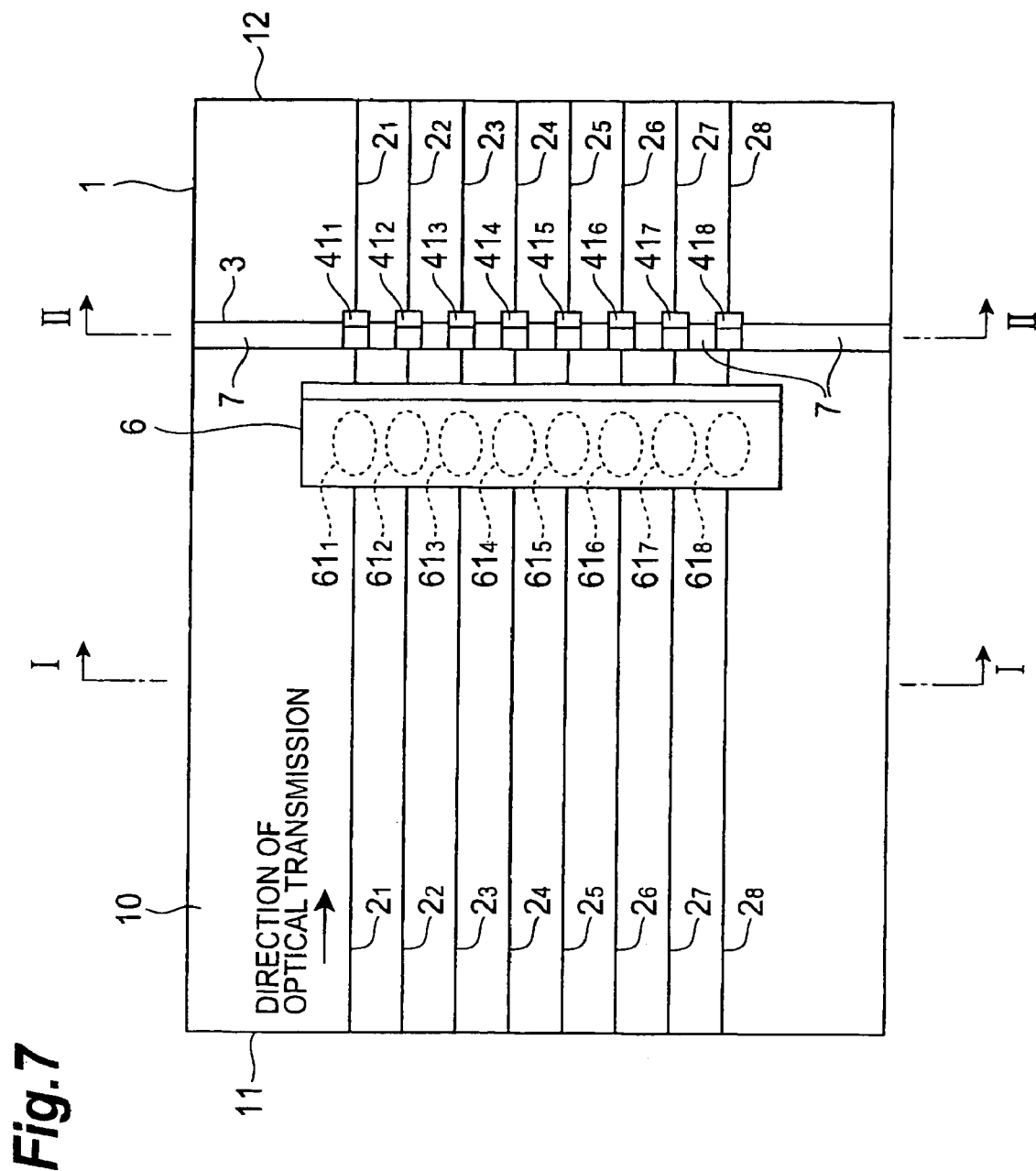
FIG. 7 is a plan view illustrating the configuration of a second embodiment of the optical waveguide module.

FIG. 7 is a plan view illustrating the configuration of a second embodiment of the optical waveguide module. This optical waveguide module comprises a planar-waveguide-type optical circuit 1 composed of a substrate 10 and planar-waveguide-type optical waveguides $2_1$–$2_8$ provided on the substrate 10.

The configuration of the present optical waveguide module is the same as the optical waveguide module shown in FIGS. 1 and 2 with respect to the optical waveguides $2_1$–$2_8$ and groove 3 of the planar-waveguide-type optical circuit 1, the filter fixing resin 5, and the photodetector array 6 having photodetectors $61_1$–$61_8$. The cross-sectional structure along the optical axis of the optical waveguide module at a position including the optical waveguide $2_n$ is the same as that shown in FIG. 2 for the first embodiment. Note that, in FIG. 7, the filter fixing resin 5 composed of the inner filling resin portion 51 and upper filling resin portion 52 is not shown for visual simplicity.

In the present embodiment, eight reflection filters $41_1$–$41_8$ are placed inside the groove 3 corresponding to the eight optical waveguides $2_1$–$2_8$, respectively, as the reflection filter for reflecting part of signal light propagated in each of the optical waveguides $2_1$–$2_8$ at a predetermined reflectance.

Figure 8A:
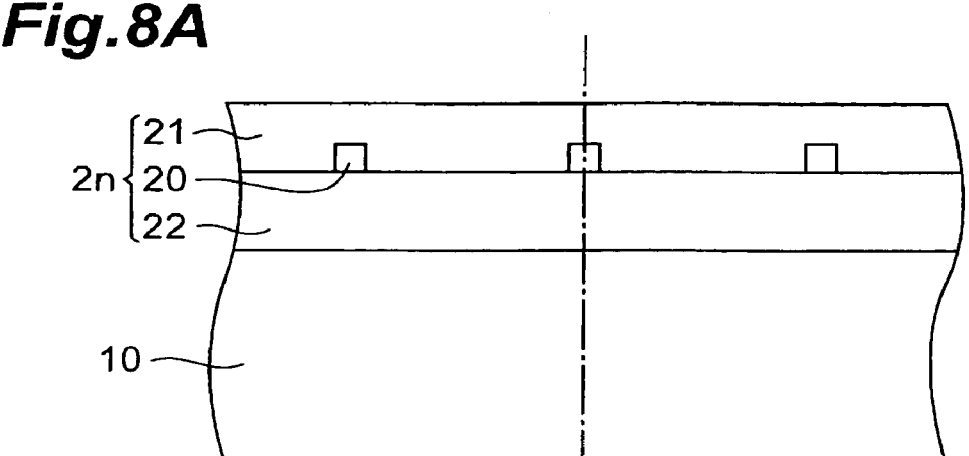
FIGS. 8A and 8B are partially enlarged cross-sectional views along the (A) I—I arrow and (B) II—II arrow illustrating cross-sectional structures perpendicular to the optical axis of the optical waveguide module shown in FIG. 7.
Figure 8B:
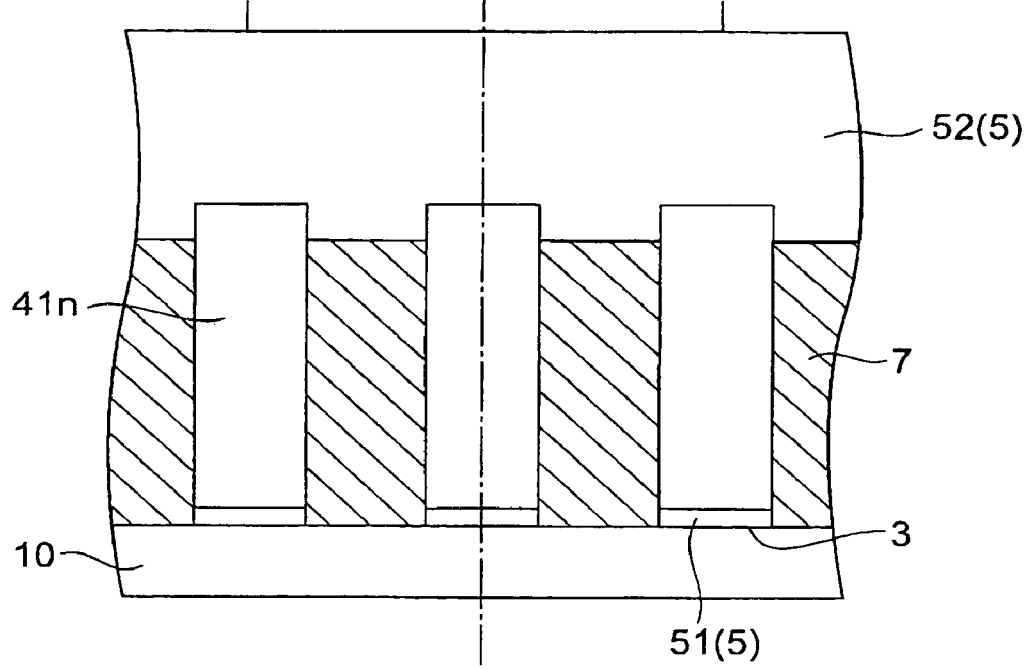

FIGS. 8A and 8B are cross-sectional views along (A) the I—I arrow and (B) the II—II arrow illustrating the cross-sectional structures of the optical waveguide module shown in FIG. 7 along the direction perpendicular to the optical axis of the optical waveguide $2_n$ (n=1, . . . , 8). Here, FIG. 8A is a cross-sectional view illustrating the structure of the optical waveguide $2_n$ at a position, as shown in FIG. 7, where the groove 3 and filter fixing resin 5 are not provided FIG. 8B is a cross-sectional view illustrating the configuration inside the groove 3 such as the reflection filter $41_n$ at a position where the groove 3 and filter fixing resin 5 are provided.

Each of the reflection filters $41_n$ (n=1, . . . , 8) is placed at a tilt angle θ substantially identical to that of the groove 3 to span at least a region through which the signal light propagated in the optical waveguide $2_n$ passes. This reflection filter $41_n$ is preferably made of a dielectric multilayer film filter, which reflects part of the signal light propagated in the optical waveguide $2_n$ having a wavelength within a predetermined signal light wavelength band at a predetermined reflectance.

Furthermore, between each pair of the eight reflection filters $41_1$–$41_8$ inside the groove 3, a light blocking layer 7 made of light blocking material is provided. The light blocking layer 7 is also provided between the reflection filter $41_1$, $41_8$ located at either end and the corresponding end of the groove 3. As a result, inside the groove 3, as shown in FIG. 8B, the reflection filters $41_n$ and light blocking layers 7 are provided alternately along the direction of the groove. The light blocking material for the light blocking layer 7 is made with, for example, light absorbing material for absorbing light having a wavelength in the signal light wavelength band.

At a predetermined position on the upper surface side of the upper cladding 21 of the planar-waveguide-type optical circuit 1, the photodetector array 6 is placed which has photodetectors $61_n$ (n= 1, . . . , 8) each corresponding to one of the optical waveguides $2_n$ and reflection filters $41_n$. This photodetector array 6 is placed so that each reflected light, which is part of the signal light propagated in the optical waveguide $2_n$ reflected by the reflection filter $41_n$, is incident on a light-receiving surface of the corresponding photodetector $61_n$.

In the optical waveguide module of the present embodiment, as with the first embodiment, the substrate 10 constituting a portion of the groove 3 provided in the optical circuit 1 for inserting the reflection filter 4 is made with a substrate made of material having a refractive index substantially identical to that of the core 20 of the optical waveguide $2_n$ and the filter fixing resin 5. As a result, reflection of light is inhibited at such regions as the inner wall portion of the groove 3 formed in the optical circuit 1 including the optical waveguides $2_1$–$2_8$, the filter fixing resin 5, and their interfaces, and thereby generation of extra scattered light inside the groove 3 is reduced. Therefore, the optical waveguide module capable of enhancing the monitoring characteristics for the signal light is obtained.

Furthermore, for the eight optical waveguides $2_1$–$2_8$ provided in the optical circuit 1, eight reflection filters $41_1$–$41_8$ corresponding to the optical waveguides $2_1$–$2_8$, respectively, and the light blocking layers 7 are alternately provided. Here, even if some level of extra scattered light is generated inside the groove 3, diffusion of the scattered light in the direction of the groove is prevented by the light blocking layers 7. As a result, since generation of crosstalk between adjacent channels is inhibited, the monitoring characteristics for the signal light can be further enhanced. Such a configuration may be applied in general to an optical waveguide module having N (where N is greater than one) optical waveguides.

Figure 9A:
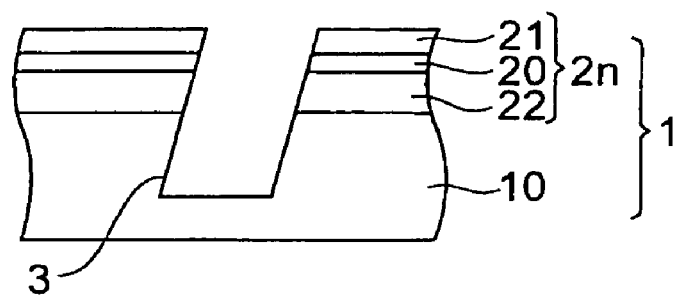
FIGS. 9A to 9C are process diagrams illustrating schematically a method of manufacturing the optical waveguide module shown in FIG. 7.
Figure 9B:
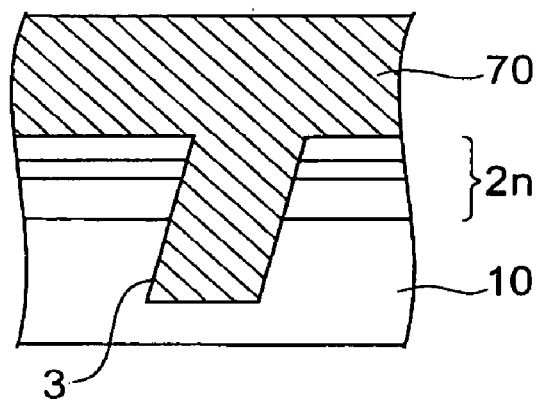
Figure 9C:
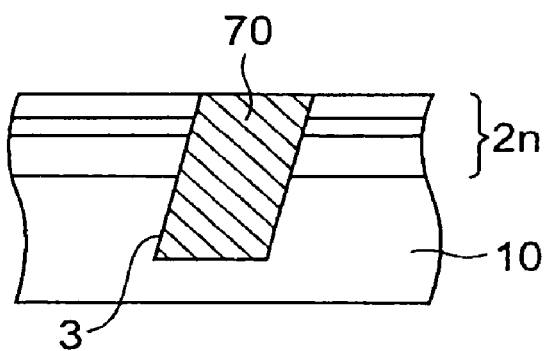
Figure 10A:
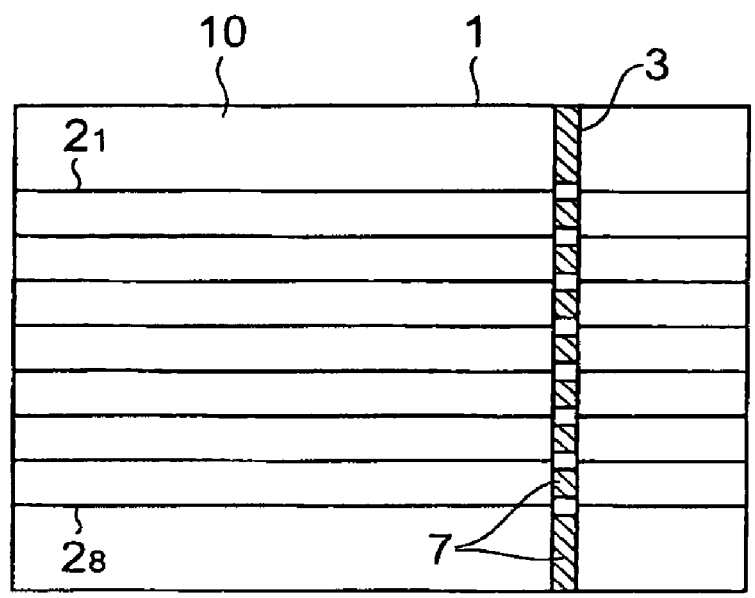
FIGS. 10A and 10B are process diagrams illustrating schematically a method of manufacturing the optical waveguide module shown in FIG. 7.
Figure 10B:
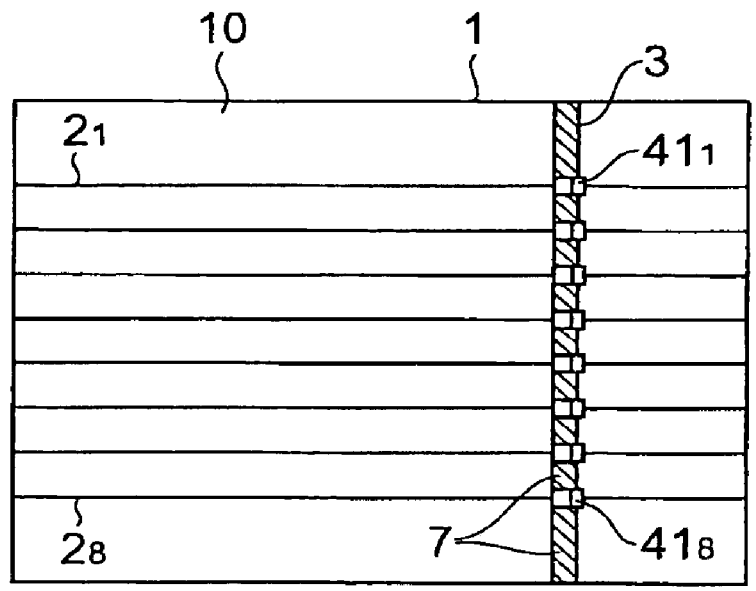

FIGS. 9A–9C, 10A and 10B are process diagrams illustrating schematically an example of a method of manufacturing the optical waveguide module shown in FIGS. 7, 8A and 8B. Here, in FIGS. 9A–9C, each process step is illustrated by a cross-sectional view along the optical axis (see FIG. 2). In FIGS. 10A and 10B, each process step is illustrated by a plan view (see FIG. 1).

First, in a planar-waveguide-type optical circuit 1 in which core 20 and claddings 21 and 22 constituting optical waveguides $2_n$ are formed on a substrate 10 made of material such as quartz glass, a groove 3 traversing the optical waveguides $2_1$–$2_8$ is formed by RIE etching at a predetermined position along the direction of optical transmission (FIG. 9A). Next, on the upper surface side of the optical circuit 1 including the groove 3, a Ge-doped glass layer 70 doped with a high concentration of Ge (germanium) is formed by the FHD method (FIG. 9B).

Here, Ge is a dopant having a light absorbing effect, and the Ge-doped glass layer 70 described above is a glass layer which can be used as a light blocking layer. The doping rate of Ge in the Ge-doped glass layer 70 is set, for example, to approximately 9 wt % (weight %). Subsequently, the Ge-doped glass layer 70 is etched back except for the portion formed inside the groove 3 to expose the upper surface of the optical circuit 1 (FIG. 9C).

Next, portions of the Ge-doped glass layer 70 left inside the groove 3 after the etch back which remain on the optical waveguides $2_1$–$2_8$ are removed by RIE etching to form light blocking layers 7 (FIG. 10A). Then, inside the groove 3 from which the Ge-doped glass layer is removed, reflection filters $41_1$–$41_8$ corresponding to the optical waveguides $2_1$–$2_8$ are inserted, respectively (FIG. 10B). By further forming filter fixing resin 5, placing a photodetector array 6 and so forth, the optical waveguide module of the configuration shown in FIGS. 7, 8A and 8B can be fabricated.

The optical waveguide module according to the present invention is not limited to the embodiments described above, but various modifications may be made. For example, for the configuration and placing method of the photodetector for detecting the reflected light from the reflection filter, various configurations other than the configuration example shown in FIGS. 1 and 2 may be used. For example, as shown in FIGS. 3A and 3B, a configuration may be used in which the photodetector array is placed on a submount substrate.

Suitable embodiments of the optical waveguide module according to the present invention will be further described.

Figure 11:
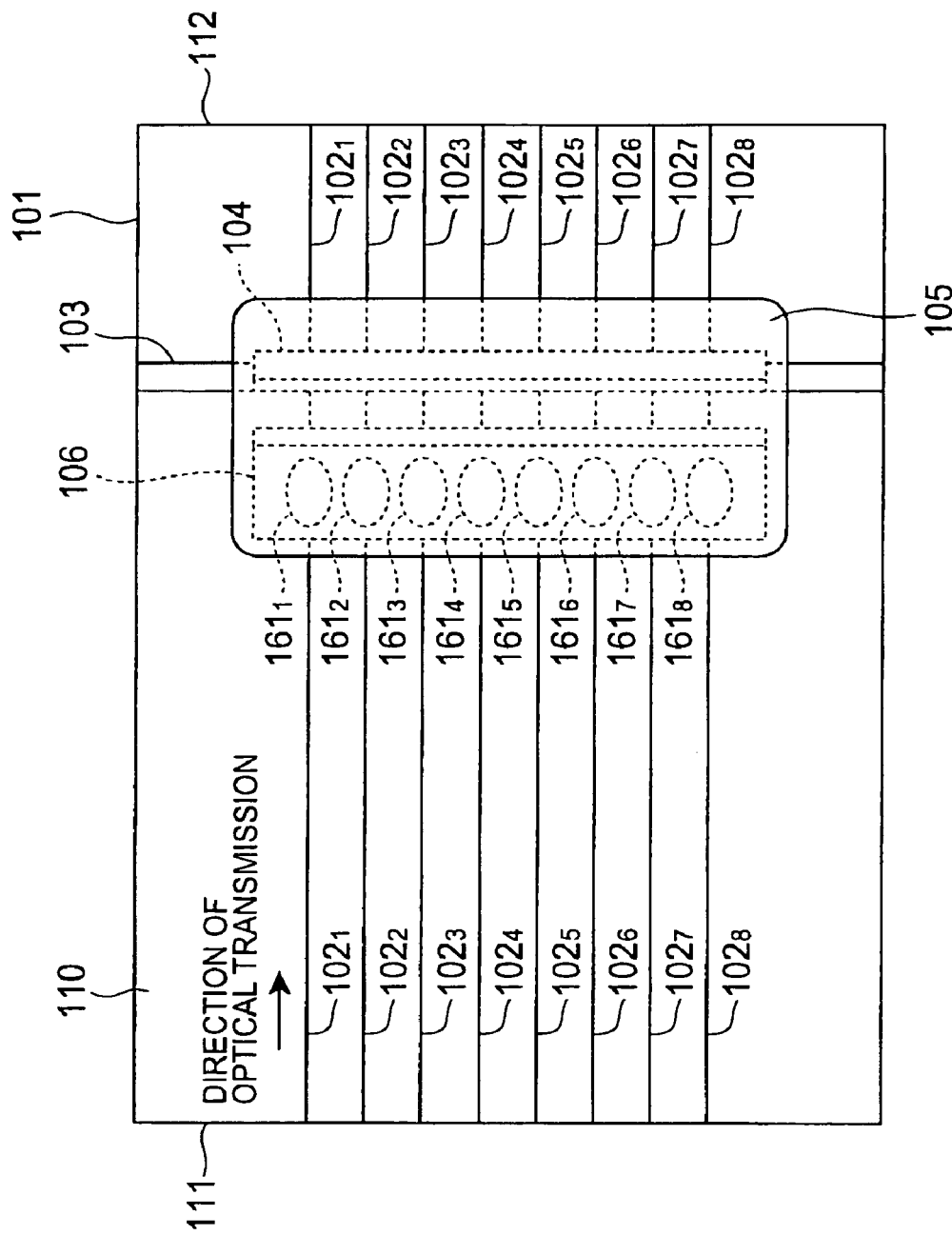
FIG. 11 is a plan view illustrating the configuration of a third embodiment of the optical waveguide module.

FIG. 11 is a plan view illustrating the configuration of a third embodiment of the optical waveguide module according to the present invention. This optical waveguide module comprises an optical circuit 101 configured to have a substrate 110 and eight (eight channels of) optical waveguides $102_1$–$102_8$ provided on the substrate 110. The present embodiment uses planar-waveguide-type optical waveguides formed on the substrate 110 as the optical waveguides $102_1$–$102_8$. As the substrate 110, a Si (silicon) substrate is used, for example.

Each of the optical waveguides $102_1$–$102_8$ is formed along a predetermined direction of optical transmission (in the direction of the arrow shown in FIG. 11) from an input end 111 toward an output end 112 of the planar-waveguide-type optical circuit 101, in parallel and equally spaced relative to each other. At a predetermined position along the direction of optical transmission of the planar-waveguide-type optical circuit 101, a groove 103 traversing the optical waveguides $102_1$–$102_8$ is formed.

Inside the groove 103 of the optical circuit 101, a reflection filter 104 is placed which reflects part of signal light propagated in each of the optical waveguides $102_1$–$102_8$ at a predetermined reflectance. The inside of the groove 103 is sealed with filling resin 105. At a position upstream of the groove 103 along the direction of optical transmission and on the upper surface side of the planar-waveguide-type optical circuit 101, a photodetector array 106 is placed. This photodetector array 106 has eight photodetectors $161_1$–$161_8$ corresponding to the eight optical waveguides $102_1$–$102_8$ provided in the planar-waveguide-type optical circuit 101, respectively.

Figure 12:
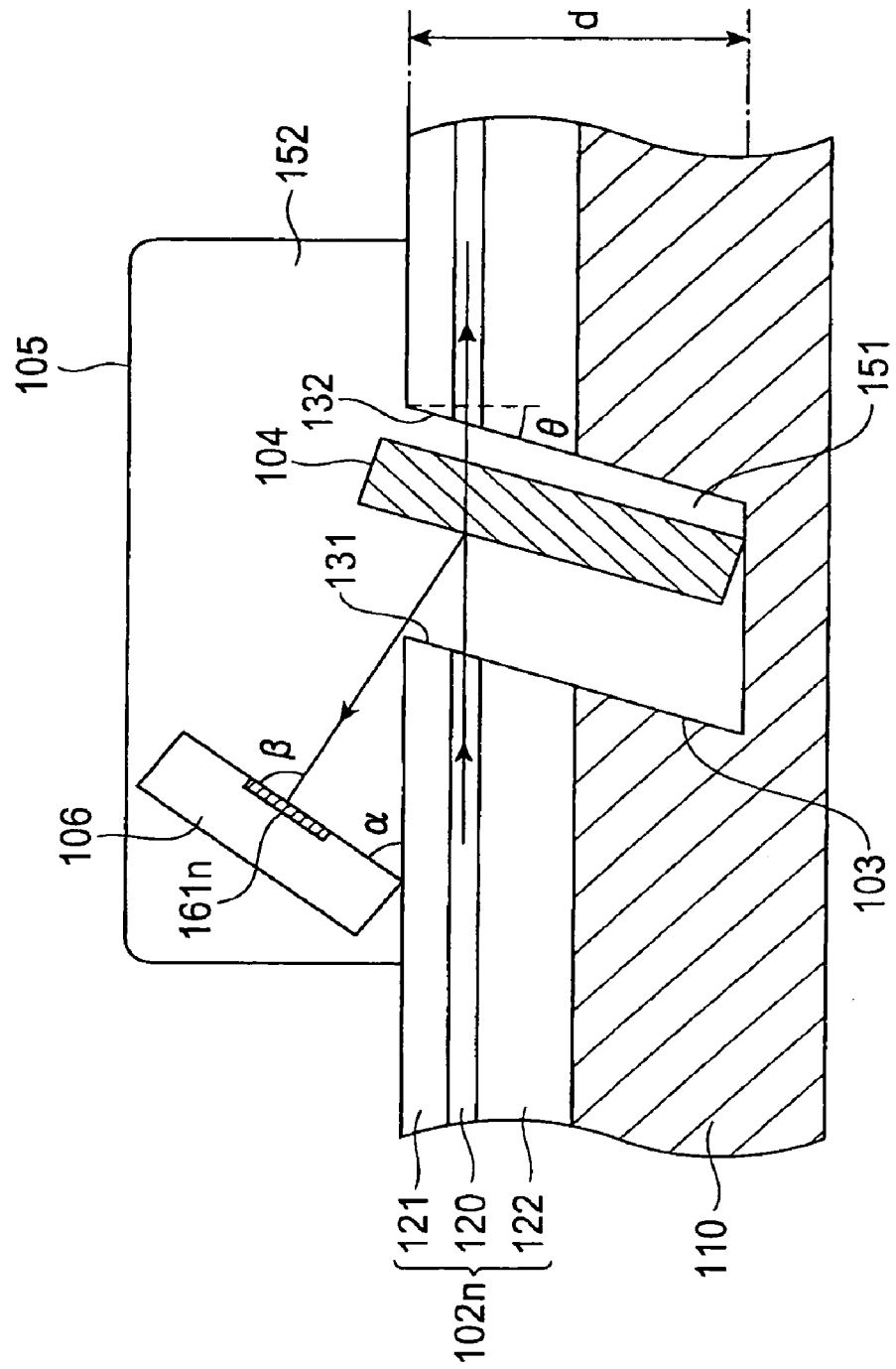
FIG. 12 is a partially enlarged cross-sectional view illustrating a cross-sectional structure along the optical axis of the optical waveguide module shown in FIG. 11.

FIG. 12 is a cross-sectional view illustrating a cross-sectional structure of the optical waveguide module shown in FIG. 11 along the direction of the optical axis of the optical waveguide $102_n$ (n=1, . . . , 8) (the direction of optical transmission in the planar-waveguide-type optical circuit 101). In FIG. 12, a portion including the groove 103, reflection filter 104, and photodetector array 106 is shown in an enlarged form.

As shown in FIG. 12, the optical waveguides $102_n$ in the planar-waveguide-type optical circuit 101 are configured by forming a lower cladding 122, core 120, and upper cladding 121 on the substrate 110. The groove 103 traversing the optical waveguides $102_n$ at the predetermined position is formed at a depth d which spans at least a region, corresponding to the core 120, through which the signal light propagated in the optical waveguide $102_n$ passes. In addition, this groove 103 is formed obliquely at a predetermined tilt angle θ (0°<θ) relative to the vertical axis orthogonal to the optical axis of the optical waveguide $102_n$ (orthogonal to the substrate 110).

In the present embodiment, the depth d of the groove 103 is set to be greater than the thickness of the optical waveguide $102_n$ down to the lower cladding 122, and part of a lower portion of the groove 103 is formed by removing a predetermined region of the substrate 110 made of a Si substrate and the like. Here, the inner wall portion of the groove 103 in the optical circuit 101 is composed of the core 120, claddings 121 and 122, and substrate 110.

Inside the groove 103, the reflection filter 104 is inserted. The reflection filter 104 is placed at a tilt angle θ substantially identical to that of the groove 103 to span at least a region through which the signal light propagated in the optical waveguide $102_n$ passes. This reflection filter 104 is preferably made of a dielectric multilayer film filter, which reflects part of the signal light propagated in the optical waveguide $102_n$ having a wavelength within a predetermined signal light wavelength band at a predetermined reflectance.

At a predetermined position on the upper surface side of the upper cladding 121 of the planar-waveguide-type optical circuit 101, the photodetector array 106 is placed which has photodetectors $161_n$ (n=1, ..., 8) each corresponding to one of the optical waveguides $102_n$. This photodetector array 106 is placed so that each reflected light, which is part of the signal light propagated in the optical waveguide $102_n$ reflected by the reflection filter 104, is incident on a light-receiving surface of the corresponding photodetector $161_n$.

In the present embodiment, the photodetector array 106 is placed so that its light-receiving surface makes an oblique angle α (0°<α<90°) relative to the upper surface of the planar-waveguide-type optical circuit 101. This angle α is preferably set so that the reflected light from the reflection filter 104 is incident on the light-receiving surface of the photodetector $161_n$ at a substantially orthogonal angle β. In the configuration example shown in FIG. 12, a front-surface-incident-type photodiode is used for the photodetector $161_n$ of the photodetector array 106. The surface of the photodetector array 106 facing the reflection filter 104 is the light-receiving surface on which the reflected light from the reflection filter 104 is incident.

The light-receiving surface of the photodetector $161_n$ is provided with an AR coating, which is a coating film preventing reflection of light within a predetermined wavelength band corresponding to the signal light wavelength band of the signal light propagated in the optical waveguide $102_n$.

The inside of the groove 103 including the reflection filter 104 is sealed with the filling resin 105. This filling resin 105 serves as filter fixing resin for fixing the reflection filter 104 placed inside the groove 103. The filter fixing resin 105 is formed with resin material having a higher refractive index than that of the core 120 of the optical waveguide $102_n$ with respect to the signal light having a wavelength in the signal light wavelength band.

The filter fixing resin 105 in the present embodiment is composed of an inner filling resin portion 151 sealing the inside of the groove 103 and an upper filling resin portion 152 sealing a predetermined range on the upper surface side of the planar-waveguide-type optical circuit 101 including the upper portion of the groove 103. The inner filling resin portion 151 and upper filling resin portion 152 are integrally formed with identical resin material. In general, the filter fixing resin is formed such that it fills at least the inside of the groove for seal thereof.

The upper filling resin portion 152 is provided in a range including at least the light-receiving surface of the photodetector array 106. As a result, between the reflection filter 104 for reflecting part of the signal light and the photodetector $161_n$ for detecting the reflected light from the reflection filter 104, the reflected light path along which the reflected light propagates is filled with the filter fixing resin 105.

In the above configuration, when the signal light of a predetermined wavelength propagated in the optical waveguide $102_n$ on the input end 111 side is emitted via an upstream end surface 131 to the inner filling resin portion 151 in the groove 103, part of the signal light is reflected obliquely upward with respect to the planar-waveguide-type optical circuit 101 at a predetermined reflectance by the reflection filter 104 placed obliquely relative to the optical axis. The other signal light components are transmitted through the inner filling resin portion 151 and reflection filter 104 and incident via a downstream end surface 132 on the optical waveguide $102_n$ at the output end 112 side.

On the other hand, the reflected light reflected by the reflection filter 104 passes through the inner filling resin portion 151 and upper filling resin portion 152 to reach the photodetector array 106, and is incident on its light-receiving surface into the photodetector $161_n$ at the predetermined incident angle β. The light intensity of the reflected light detected by the photodetector $161_n$ is then used to monitor the light intensity of the signal light propagated in the optical waveguide $102_n$.

The effect of the optical waveguide module of the present embodiment will now be described.

In the optical waveguide module shown in FIGS. 11 and 12, the signal light propagated in the optical waveguide $102_n$ provided in the optical circuit 101 is not split by an optical coupler or the like Rather, in the configuration of the optical waveguide module, part of the signal light is reflected by the reflection filter 104 placed in the groove 103 provided on the optical waveguide $102_n$, and the reflected light can be monitored by means of the light intensity of the signal light. This simplifies the configuration and manufacturing process of the optical circuit.

Furthermore, the filter fixing resin 105 filling the inside of the groove 103 which is provided in the planar-waveguide-type optical circuit 101 and in which the reflection filter 104 is inserted, is to be made with resin material having a higher refractive index than that of the core 120 of the optical waveguide $102_n$. As a result, scattered light generated inside the groove 103 is actively emitted outside, and thereby confinement and diffusion of extra scattered light inside the groove 103 is inhibited as described below. Therefore, influence of the extra scattered light is reduced and the optical waveguide module capable of enhancing the monitoring characteristics for the signal light is obtained.

Here, regarding the resin material for the filter fixing resin 105, it is preferable to use resin material which does not contain particles of dimensions substantially identical (or comparable) to the wavelength in the signal light wavelength band. If resin material containing filler particles having dimensions comparable to the wavelength of the signal light for communication is used as the filter fixing resin 105, scattering of light occurs by the filler particles inside the filter fixing resin 105, which results in increasing extra scattered light inside the filter fixing resin 105. On the contrary, by using resin material which does not contain filler particles of such dimensions, scattering of light inside the filter fixing resin 105 is inhibited from occurring.

Furthermore, as shown in FIG. 12, the groove 103 formed in the optical circuit 101 is preferably formed obliquely at a predetermined tilt angle θ relative to the vertical axis orthogonal to the optical axis of the optical waveguide $102_n$. As a result, a configuration is suitably realized for monitoring the light intensity of the signal light by detecting the reflected light from the reflection filter 104 with the photodetector $161_n$. In this case, as the reflection filter 104 for reflecting part of the signal light, it is preferable to use a reflection filter which achieves polarization compensation to allow the reflectances for the two orthogonal polarizations to be substantially equal.

As an optical circuit in which optical waveguides are provided on its substrate and a groove for inserting a reflection filter is formed, FIGS. 11 and 12 show the planar-waveguide-type optical circuit 1 made with the planar-waveguide-type optical waveguides $102_n$. However, optical circuits having other configurations may be used. For example, an optical circuit configured by fixing optical fibers as optical waveguides in a fixing V-groove formed on the substrate, or an optical circuit configured with planar-waveguide-type optical waveguides in combination with optical fibers, may be used.

The configuration and effect of the optical waveguide module shown in FIGS. 11 and 12 will be described more specifically.

As described above, FIGS. 3A and 3B are (A) a plan view and (B) a cross-sectional view illustrating an example of the configuration of the optical waveguide module. FIG. 4 is a graph illustrating a light intensity distribution in the optical waveguide module shown in FIGS. 3A and 3B.

Referring to the graph shown in FIG. 4, as described above, in the region R0, a light intensity distribution of substantially Gaussian shape is obtained corresponding to the light intensity distribution of the signal light itself. On the other hand, in the outside regions R1 and R2, the detected light intensity does not decrease sufficiently, leaving some level of light intensity in a wide range. For example, if photodiodes of adjacent channels are spaced apart by 250 μm, the crosstalk in these channels will be on the order of 38 dB.

Figure 13:
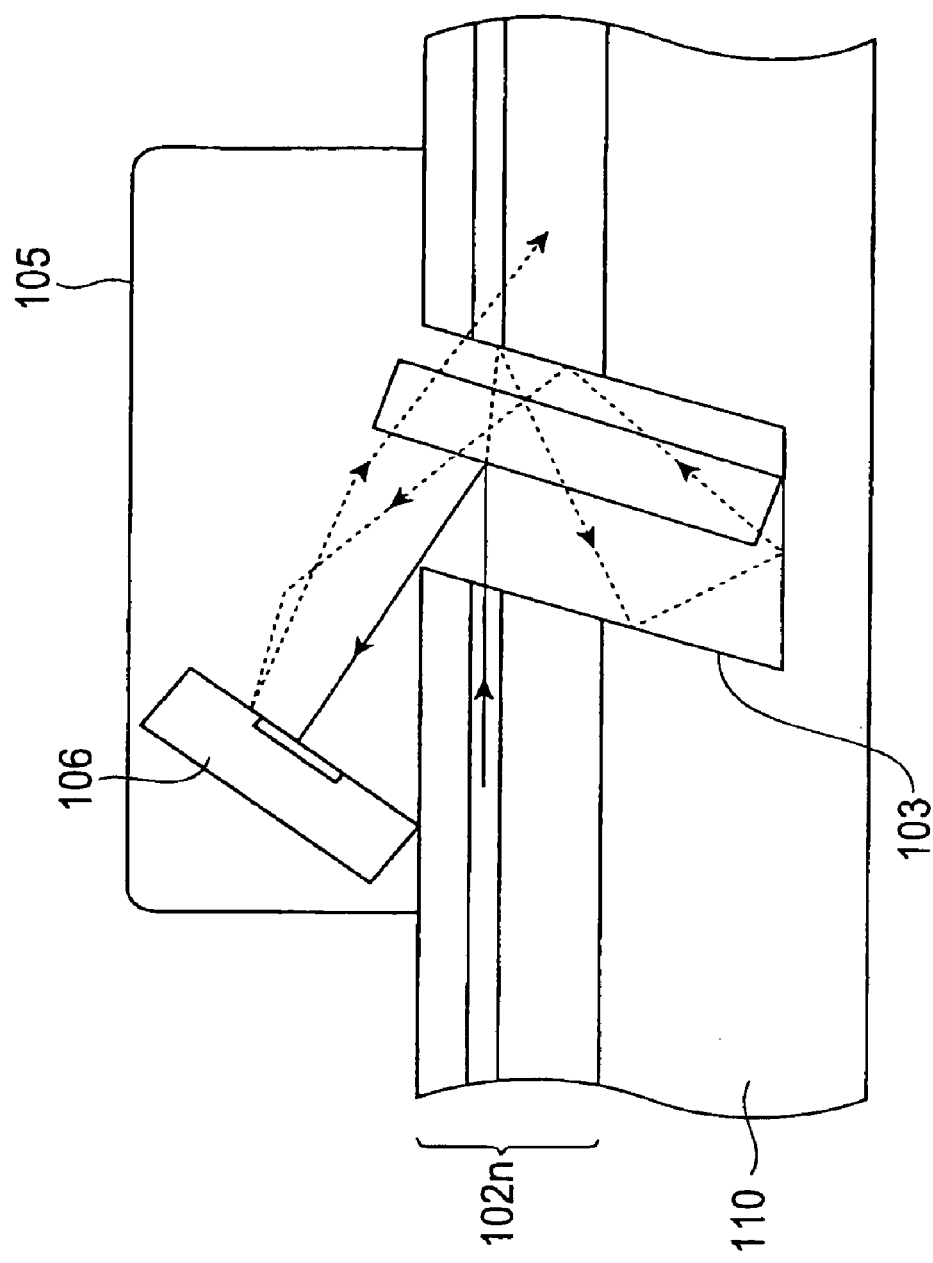
FIG. 13 is a schematic view illustrating generation of scattered light in the optical waveguide module.

The extra residual light intensity distribution in such outside regions R1 and R2, and the resultant degradation of S/N ratio in the photodetectors, or degradation of crosstalk between adjacent channels, may be caused by generation of extra scattered light, and its confinement and diffusion, inside the groove for inserting the reflection filter. FIG. 13 is a schematic view illustrating the generation of scattered light in the optical waveguide module.

More specifically, in the optical waveguide module shown in FIGS. 3A and 3B, the regions constituting the groove have approximately the following refractive indices, n: n=1.46 for quartz-based optical waveguides; n=1.6 for the polyimide-substrate-based reflection filter; and n=3.46 for the Si substrate of the optical circuit. In such a configuration, the difference of refractive indices in various regions of the groove will cause reflection of light at their interfaces. For example, the Si substrate is substantially transparent to the signal light in the wavelength band of λ=1.55 μm used as a signal light wavelength band for communication. However, the difference of the refractive index compared to the other regions such as the filter fixing resin causes extra reflection of light at its interface.

Furthermore, in the above configuration where the inside of the groove is filled with resin for fixing the reflection filter, the scattered light generated inside the groove is reflected at the interface with the inner wall portion of the groove and the like, and at the same time, as shown schematically in FIG. 13 by dashed lines, the scattered light is confined in the periphery of the reflection filter and diffused inside the groove in the direction of the groove. The scattered light inside the groove is also generated by surface roughness of the inner wall of the groove, refraction of light in the reflection filter, coupling loss caused by the signal light reentering the optical waveguide from the downstream end surface of the groove, reflection of light at the light-receiving surface of the photodetectors, and the like. Such scattered light is confined as well in the periphery of the reflection filter and diffused in the direction of the groove.

On the contrary, in the optical waveguide module shown in FIGS. 11 and 12, with regard to the filter fixing resin 105 filling the groove 103 of the optical circuit 101 in which the reflection filter 104 is inserted, the filter fixing resin 105 is formed with resin material having a higher refractive index than that of the core 120 of the optical waveguide $102_n$.

As a result, even if any extra scattered light is generated inside the groove 103, the scattered light can be emitted out of the filter fixing resin 105 filling the groove 103, so that the scattered light may be actively let out. Here, the above-described confinement of scattered light inside the groove 103, and its diffusion in the direction of the groove are inhibited. This results in preventing degradation of monitoring characteristics for the signal light, such as the S/N ratio at the photodetectors and the crosstalk between adjacent channels, caused by the scattered light generated inside the groove 103, thereby enhancing the monitoring characteristics.

Figure 14:
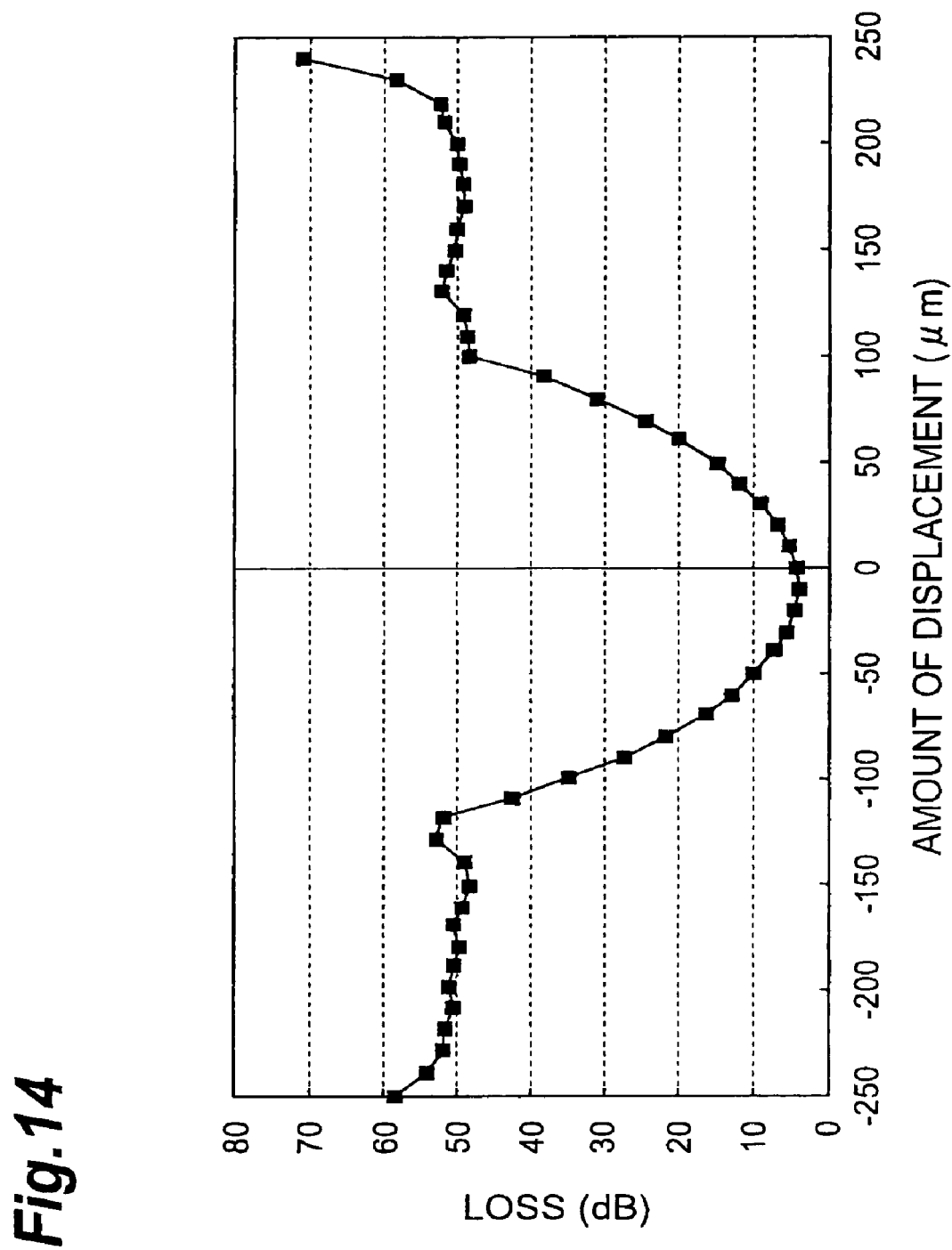
FIG. 14 is a graph illustrating a light intensity distribution in the optical waveguide module shown in FIG. 11.

FIG. 14 is a graph illustrating a light intensity distribution in the optical waveguide module shown in FIGS. 11 and 12. This graph shows the spread of scattered light in the direction of the groove 103 when signal light is inputted to a particular channel in the eight-channel optical waveguide module having the configuration shown in FIG. 11.

In this graph, the horizontal axis indicates an amount of displacement (μm) in the direction of the groove from the optical waveguide $102_n$ of the channel to which the signal light is inputted. The vertical axis indicates the light intensity detected at each position as the photodetector is displaced in the direction of the groove, in terms of its loss (dB) where the light intensity of the inputted signal light is used as a reference.

With regard to specific conditions, the material for the filter fixing resin 105 is made with organic silicone-based resin having a refractive index n=1.48, which is higher than the refractive index of the core 120 of the optical waveguide $102_n$, n=1.46. The substrate 110 of the optical circuit 101 is made with a Si substrate. Regarding the optical waveguide $102_n$, reflection filter 104 and others, the conditions are the same as those described above with reference to FIG. 4.

As shown in FIG. 14, in the optical waveguide module where resin material having a higher refractive index than that of the core 120 of the optical waveguide $102_n$ is used as the filter fixing resin 105, confinement of the scattered light generated inside the groove 103 and its diffusion in the direction of the groove are inhibited. This results in reducing the light intensity of the scattered light remaining in the outside regions relative to the channel to which the signal light is inputted, thereby enhancing the monitoring characteristics for the light intensity of the signal light by the optical waveguide module. In the example shown in FIG. 14, the crosstalk in the adjacent channels is improved by approximately 5 dB.

Figure 15:
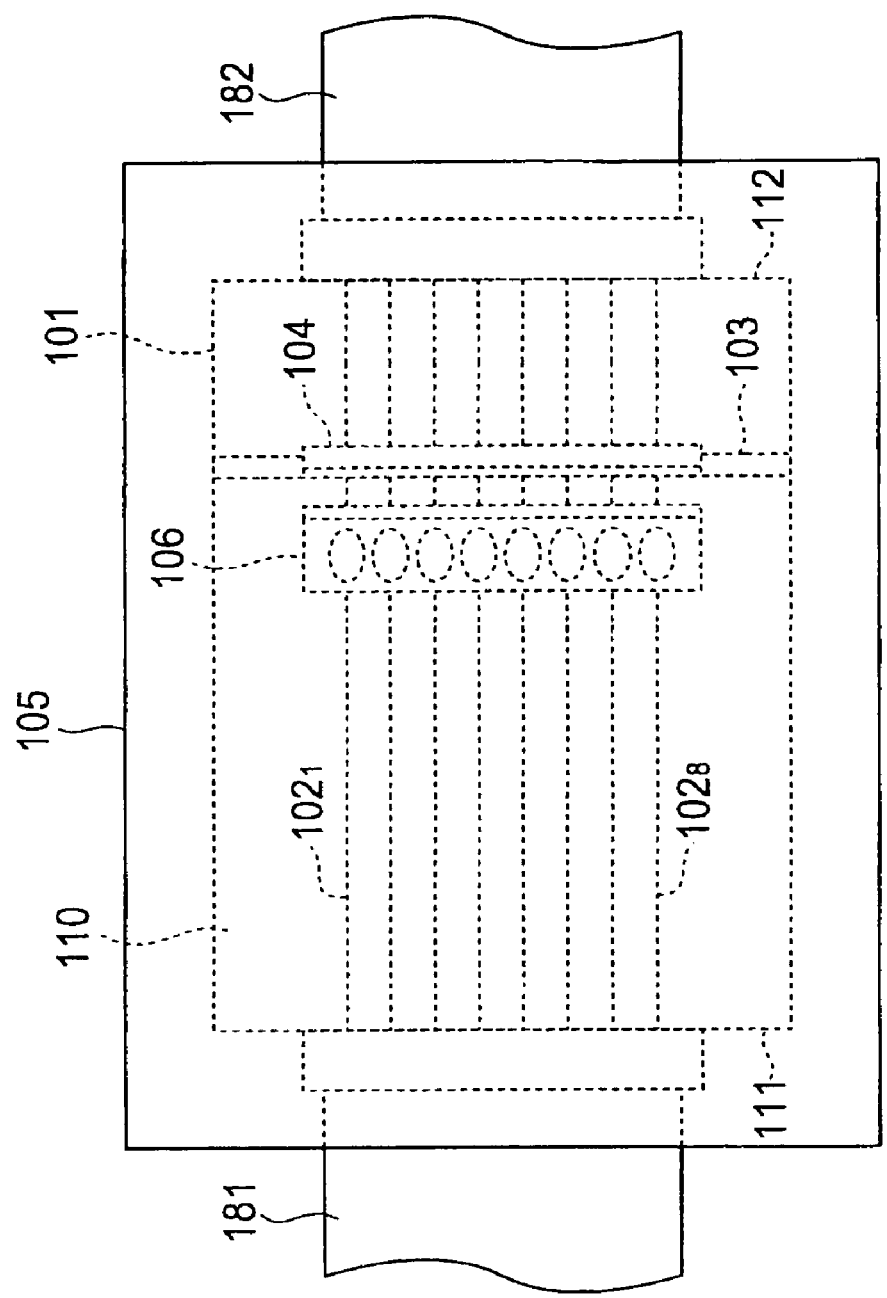
FIG. 15 is a plan view illustrating a variation of the configuration of the optical waveguide module shown in FIG. 11.

Here, regarding the range where the filter fixing resin 105 is formed, in view of the function of diffusing and emitting out the scattered light generated inside the groove 103, the resin to be formed into the filter fixing resin 105 is preferably applied to a wide range. For example, as shown in FIG. 15, which shows a variation of the configuration of the optical waveguide module shown in FIG. 11, the filter fixing resin 105 may be provided to fill the entire package of the optical waveguide module by covering the optical circuit 101 and the like. However, if the filter fixing resin 105 is applied directly to the photodetector array 106, it is preferable to use resin material having a low Young's modulus such as silicone-based resin.

In addition, FIG. 15 also shows a tape fiber 181 for signal light input connected to the input end 111 of the optical circuit 101, and a tape fiber 182 for signal light output connected to the output end 112.

Figure 16:
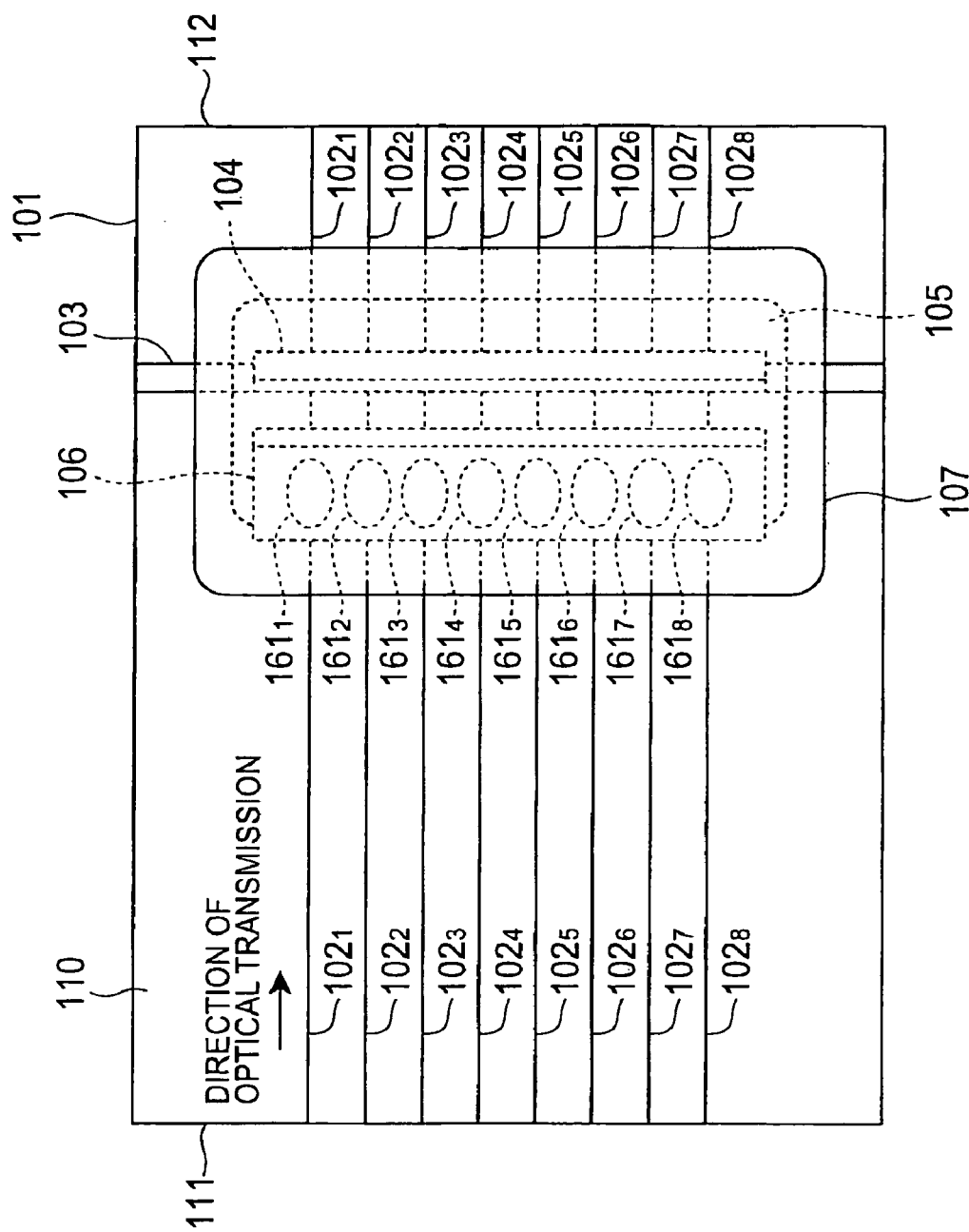
FIG. 16 is a plan view illustrating the configuration of a fourth embodiment of the optical waveguide module.

FIG. 16 is a plan view illustrating the configuration of a fourth embodiment of the optical waveguide module. This optical waveguide module comprises a planar-waveguide-type optical circuit 101 configured to have a substrate 110 and planar-waveguide-type optical waveguides $102_1$–$102_8$ provided on the substrate 110.

The configuration of the present optical waveguide module is the same as the optical waveguide module shown in FIGS. 11 and 12 with respect to the optical waveguides $102_1$–$102_8$ and groove 103 provided in the planar-waveguide-type optical circuit 101, the reflection filter 104, and the photodetector array 106 having photodetectors $161_1$–$161_8$. In the present embodiment, scattered light reducing resin 107 made of one layer of resin is further provided outside the filter fixing resin 105.

Figure 17:
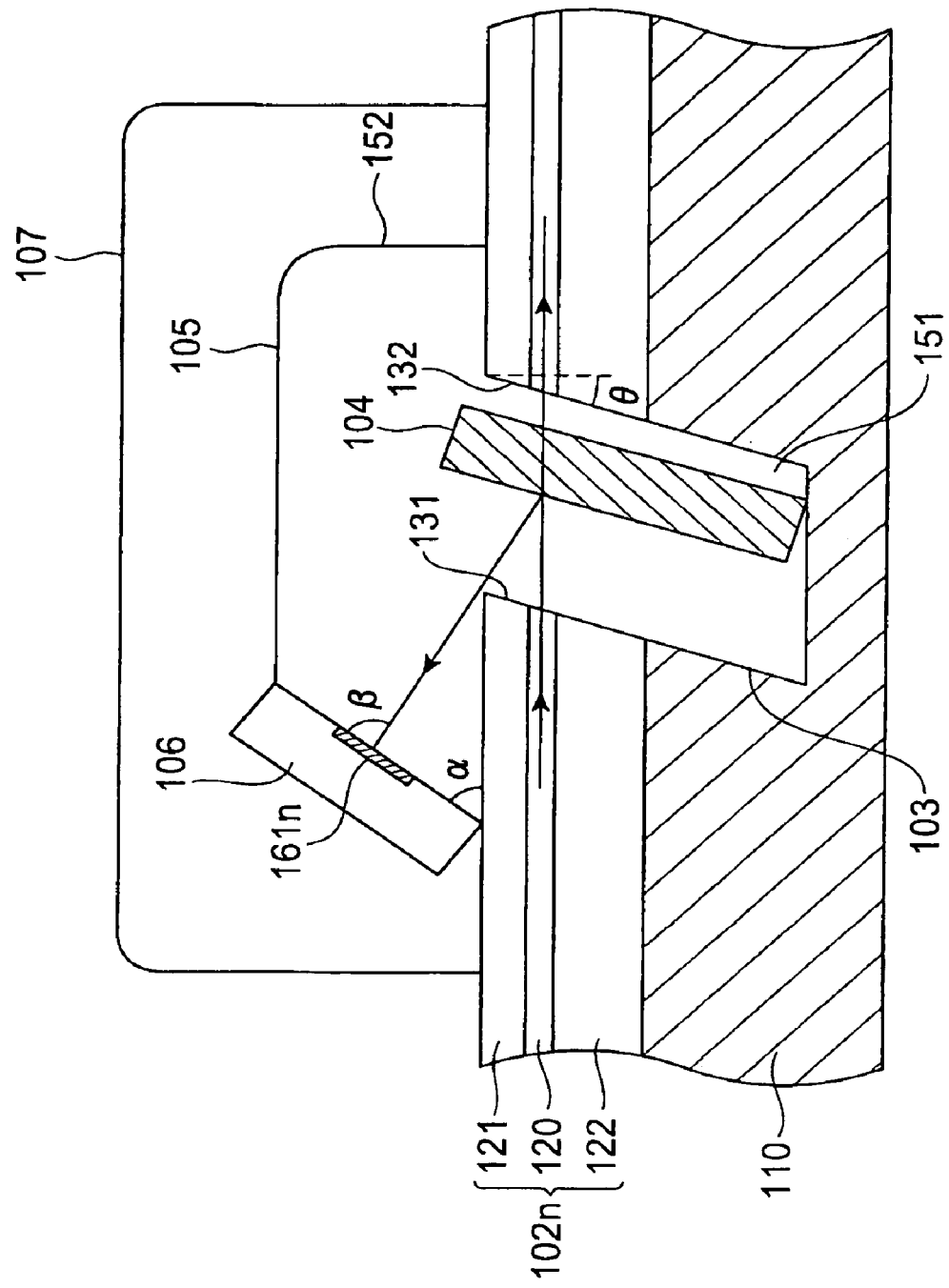
FIG. 17 is a partially enlarged cross-sectional view illustrating a cross-sectional structure along the optical axis of the optical waveguide module shown in FIG. 16.

FIG. 17 is a cross-sectional view illustrating a cross-sectional structure of the optical waveguide module shown in FIG. 16 along the direction of the optical axis of the optical waveguide $102_n$. In FIG. 17, a portion including the groove 103, reflection filter 104, and photodetector array 106 is shown in an enlarged form.

The groove 103 traversing the optical waveguides $102_n$ at the predetermined position in the planar-waveguide-type optical circuit 101 is formed to a depth which is greater than the thickness of the optical waveguide $102_n$ down to the lower cladding 122, and obliquely at a predetermined tilt angle θ. Here, the inner wall portion of the groove 103 in the optical circuit 101 is composed of the core 120, claddings 121 and 122, and substrate 110.

Inside the groove 103, the reflection filter 104 is inserted. The reflection filter 104 is placed at a tilt angle θ substantially identical to that of the groove 103 to span at least a region through which the signal light propagated in the optical waveguide $102_n$ passes. This reflection filter 104 is preferably made of a dielectric multilayer film filter, which reflects part of the signal light propagated in the optical waveguide $102_n$ having a wavelength within a predetermined signal light wavelength band at a predetermined reflectance.

At a predetermined position on the upper surface side of the upper cladding 121 of the planar-waveguide-type optical circuit 101, the photodetector array 106 is placed which has photodetectors $161_n$ each corresponding to one of the optical waveguides $102_n$. This photodetector array 106 is placed so that each reflected light, which is part of the signal light propagated in the optical waveguide $102_n$ reflected by the reflection filter 104, is incident on a light-receiving surface of the corresponding photodetector $161_n$.

The light-receiving surface of the photodetector $161_n$ is provided with an AR coating, which prevents reflection of light within a predetermined wavelength band corresponding to the signal light wavelength band of the signal light propagated in the optical waveguide $102_n$.

The inside of the groove 103 including the reflection filter 104 is sealed with the filling resin 105. This filling resin 105 serves as filter fixing resin for fixing the reflection filter 104 placed inside the groove 103. The filter fixing resin 105 is formed with resin material having a higher refractive index than that of the core 120 of the optical waveguide $102_n$ with respect to the signal light having a wavelength in the signal light wavelength band.

The filter fixing resin 105 in the present embodiment is composed of an inner filling resin portion 151 sealing the inside of the groove 103 and an upper filling resin portion 152 sealing a predetermined range on the upper surface side of the planar-waveguide-type optical circuit 101 including the upper portion of the groove 103. The inner filling resin portion 151 and upper filling resin portion 152 are integrally formed with identical resin material. Here, the upper filling resin portion 152 is provided in a range including at least the light-receiving surface of the photodetector array 106.

Furthermore, one layer of scattered light reducing resin 107 is provided outside the filter fixing resin 105. This scattered light reducing resin 107 is formed in a predetermined range on the upper surface side of the planar-waveguide-type optical circuit 101 to cover the upper filling resin portion 152 of the filter fixing resin 10S and the photodetector array 106. The scattered light reducing resin 107 is formed with resin material having a higher refractive index than that of the filter fixing resin 105 with respect to the signal light having a wavelength within the signal light wavelength band.

In the optical waveguide module of the present embodiment, as with the third embodiment, the filter fixing resin 105 filling the inside of the groove 103 which is provided in the planar-waveguide-type optical circuit 101 for inserting the reflection filter 104, is made with resin material having a higher refractive index than that of the core 120 of the optical waveguide $102_n$. As a result, scattered light generated inside the groove 103 is actively emitted outside, and thereby confinement and diffusion of extra scattered light inside the groove 103 are inhibited. Therefore, influence of the extra scattered light is reduced and the optical waveguide module capable of enhancing the monitoring characteristics for the signal light is obtained.

Moreover, in addition to this filter fixing resin 105, around its periphery, the scattered light reducing resin 107 is provided as a resin layer made with resin material having a higher refractive index than that of the filter fixing resin 105. As a result, the scattered light generated inside the groove 103 is emitted outside more effectively, and thereby the monitoring characteristics for the signal light can be further enhanced.

Figure 18:
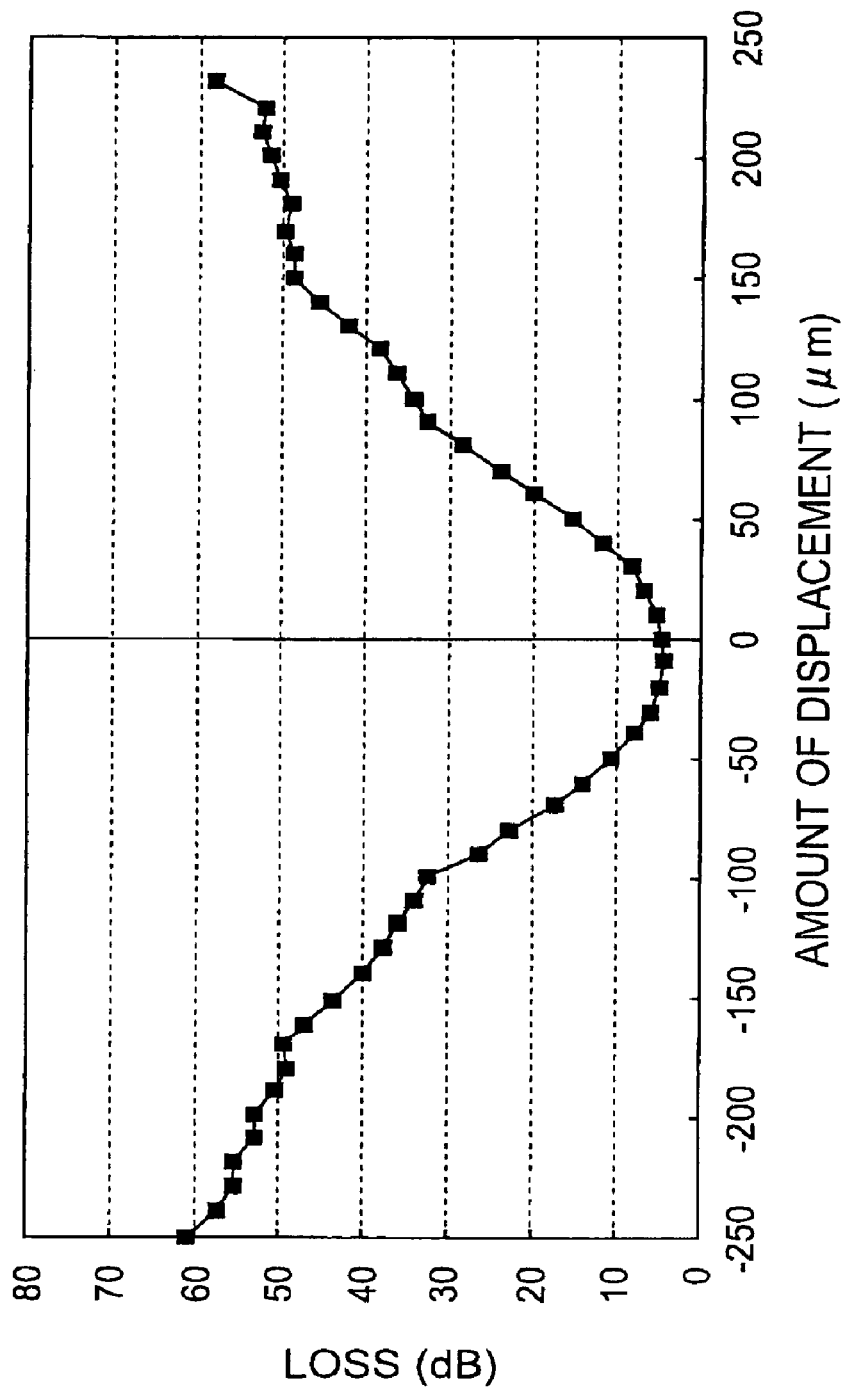
FIG. 18 is a graph illustrating a light intensity distribution in the optical waveguide module shown in FIG. 16.

FIG. 18 is a graph illustrating a light intensity distribution in the optical waveguide module shown in FIGS. 16 and 17. This graph shows the spread of scattered light in the direction of the groove 103 when signal light is inputted to a particular channel in the eight-channel optical waveguide module having the configuration shown in FIG. 16.

In this graph, the horizontal axis indicates an amount of displacement (μm) in the direction of the groove from the optical waveguide $102_n$ of the channel to which the signal light is inputted. The vertical axis indicates the light intensity detected at each position as the photodetector is displaced in the direction of the groove, in terms of its loss (dB) where the light intensity of the inputted signal light is used as a reference.

With regard to specific conditions, the material for the filter fixing resin 105 is made with organic silicone-based resin having a refractive index n=1.48, which is higher than the refractive index of the core 120 of the optical waveguide $102_n$, n=1.46. The material for the scattered light reducing resin 107 is made with UV acrylic resin which has a refractive index of n=1.53 being higher than the refractive index of this filter fixing resin 105. The substrate 110 of the optical circuit 101 is made with a Si substrate. Regarding the optical waveguide 102$_n$, reflection filter 104 and others, the conditions are the same as those described above with reference to FIG. 4.

As shown in FIG. 18, in the optical waveguide module where resin material having a higher refractive index than that of the core 120 of the optical waveguide 102$_n$ is used as the filter fixing resin 105, and where more resin material having a further higher refractive index than that of the filter fixing resin 105 is used as the scattered light reducing resin 107, confinement of the scattered light generated inside the groove 103 and its diffusion in the direction of the groove are inhibited as with the case shown in FIG. 14, and thereby the monitoring characteristics for the light intensity of the signal light is enhanced.

More specifically, in the configuration where only the filter fixing resin 105 is provided, the periphery of the filter fixing resin 105 is air, which has a refractive index of 1, being lower than that of the filter fixing resin 105. On the other hand, by providing the above-described scattered light reducing resin 107 around the periphery of the filter fixing resin 105, the scattered light inside the filter fixing resin 105 is effectively emitted out to the scattered light reducing resin 107 and its outside. In the example shown in FIG. 18, the crosstalk in the adjacent channels is improved by approximately 5 dB.

Here, regarding resin material used for the scattered light reducing resin 107, various kinds of material may be used provided that the above-described conditions for the refractive index are satisfied. For example, either of resin material being transparent to light with a wavelength in the signal light wavelength band, or light absorbing resin material may be used.

Regarding the range where the scattered light reducing resin 107 is formed, in view of the function of diffusing and emitting out the scattered light generated inside the groove 103, it is preferable to form the scattered light reducing resin 107 in a wide range as with the filter fixing resin 105 (see FIG. 15). Furthermore, for the number of layers of the scattered light reducing resin, in the configuration example shown in FIGS. 16 and 17, one layer of scattered light reducing resin 107 is provided around the periphery of the filter fixing resin 105. However, a plurality of resin layers may be provided. In this case, it is preferable to provide a configuration where the refractive indices are successively increased from the filter fixing resin 105 side to the outside.

In the third embodiment shown in FIGS. 11 and 12, and the fourth embodiment shown in FIGS. 16 and 17, the planar-waveguide-type optical circuit 101 in which the planar-waveguide-type optical waveguides 102$_n$ are formed on the substrate 110 is used as the optical circuit in which the groove for inserting the reflection filter is formed. This optical circuit is not limited to the planar-waveguide-type optical circuit. Rather, an optical circuit configured with optical fibers in part or all of the optical circuit portion may be used.

Figure 19A:
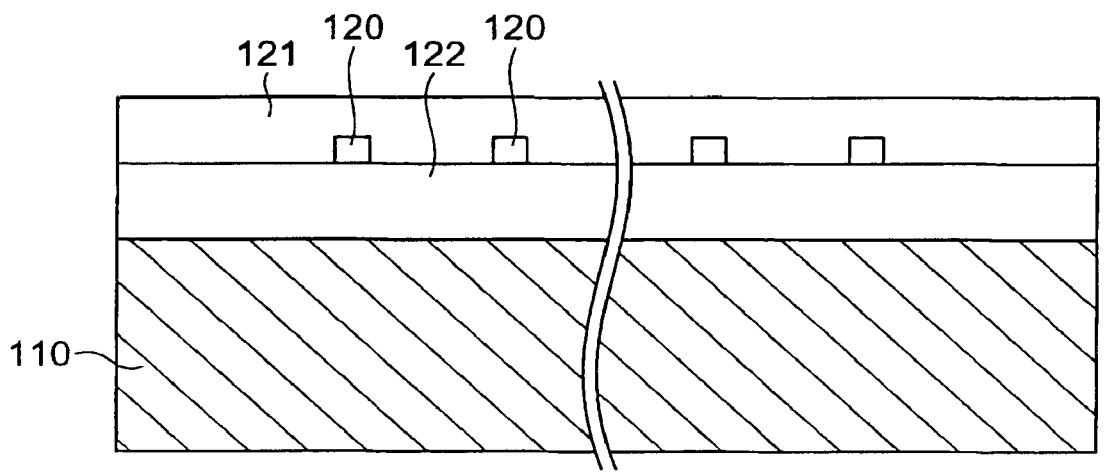
FIGS. 19A and 19B are a cross-sectional view illustrating a cross-sectional structure perpendicular to the optical axis of the optical circuit when (A) planar-waveguide-type optical waveguides, and (B) optical fibers, are used for the optical waveguides.
Figure 19B:
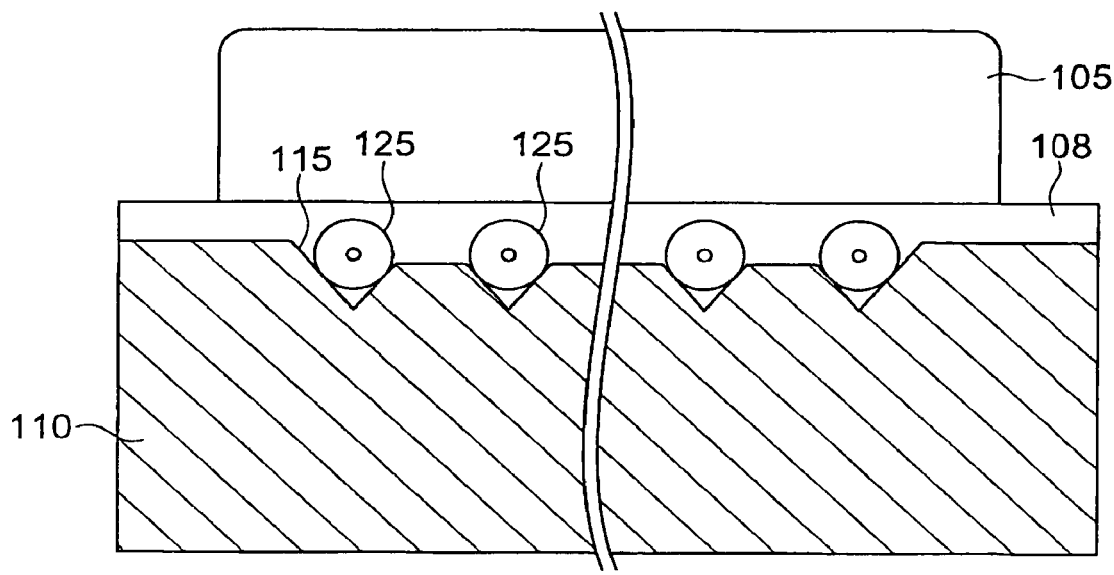

FIGS. 19A and 19B are cross-sectional views each illustrating a cross-sectional structure of the optical waveguide module along the direction perpendicular to the optical axis of the optical waveguide. FIG. 19A shows a cross-sectional structure of the optical circuit where planar-waveguide-type optical waveguides are used for the optical waveguides. This corresponds to the cross-sectional structure perpendicular to the optical axis of the optical waveguide module shown in FIGS. 11 and 12. FIG. 19B shows a cross-sectional structure of the optical circuit where optical fibers are used for the optical waveguides in place of the planar-waveguide-type optical waveguides.

The optical circuit shown in FIG. 19A is configured, as described above with reference to FIG. 12, by forming a lower cladding 122, core 120, and upper cladding 121 on the substrate 110. On the other hand, in the optical circuit shown in FIG. 19B, V-grooves 115 functioning as optical fiber aligning members are formed on the upper surface side of the substrate 110 in parallel and equally spaced relative to each other. An optical fiber 125 composed of a core and cladding is then fixed in each of this plurality of V-grooves 115, and thereby an optical circuit is configured in which optical fibers 125 serving as optical waveguides are provided on the substrate 110.

Here, in the optical circuit made with optical fibers 125, in order to fix the optical fibers 125 placed in the V-grooves 115 on the upper surface side of the substrate 110, fiber fixing resin 108 is provided to cover the upper surface of the substrate 110 and the optical fibers 125. In such a configuration, as shown in FIG. 19B, when the filter fixing resin 105 is formed to contact with the upper surface of the fiber fixing resin 108, any mismatch of refractive index between the filter fixing resin 105 and fiber fixing resin 108 may cause extra reflection of light at their interface.

Therefore, in the configuration where optical fibers 125 fixed on the substrate 110 are used for optical waveguides in the optical circuit, it is preferable to form the fiber fixing resin 108 for fixing the optical fibers 125 with resin material having a refractive index substantially identical to that of the filter fixing resin 105. As a result, since reflection of light generated at the interface between the filter fixing resin 105 and fiber fixing resin 108 is inhibited, generation of extra scattered light inside the groove and filling resin, and its confinement and diffusion are inhibited. Therefore, influence of the extra scattered light is reduced, and the monitoring characteristics for the signal light can be enhanced.

Figure 20:
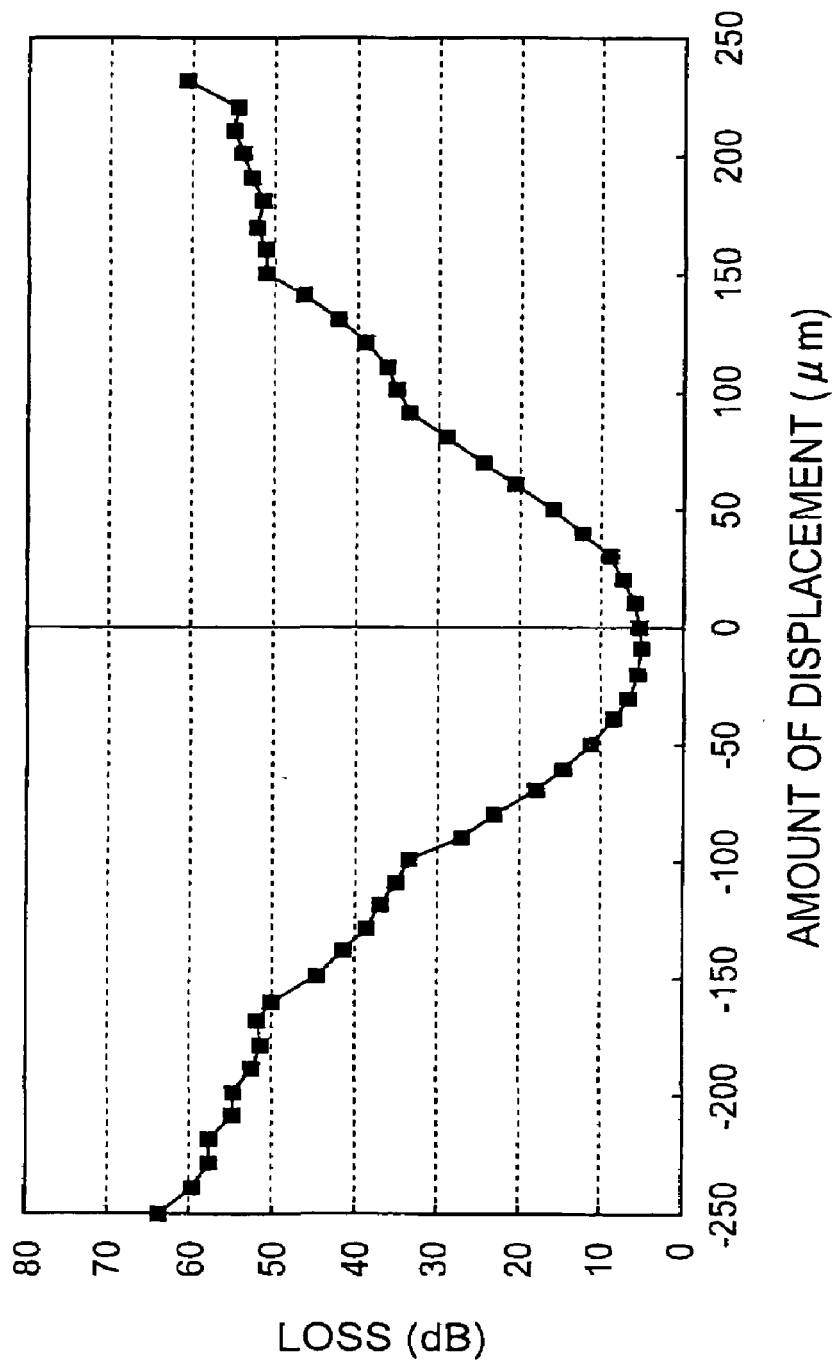
FIG. 20 is a graph illustrating a light intensity distribution in the optical waveguide module in which optical fibers are used for the optical waveguides of the optical circuit.

FIG. 20 is a graph illustrating a light intensity distribution in the optical waveguide module where optical fibers are used as the optical waveguides in the optical circuit. This graph shows the spread of scattered light in the direction of the groove 103 when signal light is inputted to a particular channel in the eight-channel optical waveguide module made with the optical circuit of the configuration shown in FIG. 19B.

In this graph, the horizontal axis indicates an amount of displacement (μm) in the direction of the groove from the optical fiber 125 of the channel to which the signal light is inputted. The vertical axis indicates the light intensity detected at each position as the photodetector is displaced in the direction of the groove, in terms of its loss (dB) where the light intensity of the inputted signal light is used as a reference.

With regard to specific conditions, the material for the filter fixing resin 105 is made with organic silicone-based resin having a refractive index n=1.48, which is higher than the refractive index of the core of the optical fiber 125, n=1.46. The material for the fiber fixing resin 108 is made with resin having a refractive index substantially identical to that of the filter fixing resin 105. The material for the scattered light reducing resin 107 is made with UV acrylic resin having a refractive index of n=1.47. In addition, the filter fixing resin 105 is made with resin material which does not contain filler particles with a particle diameter of approximately 1 μm, being comparable with the wavelength of the signal light, and thereby in which scattering of light is inhibited.

As shown in FIG. 20, in the optical waveguide module where resin material having a higher refractive index than that of the core of the optical fiber 125 is used as the filter fixing resin 105, and where the refractive indices of the filter fixing resin 105 and fiber fixing resin 108 are set to be substantially identical to each other, generation of extra scattered light inside the filter fixing resin 105, confinement of the scattered light, and its diffusion in the direction of the groove are inhibited as with the case shown in FIGS. 14 and 18, and thereby the monitoring characteristics for the light intensity of the signal light is enhanced. In the example shown in FIG. 20, the crosstalk in the adjacent channels is further improved by approximately 2 dB as compared with the example shown in FIG. 18.

The optical waveguide module according to the present invention is not limited to the embodiments described above, but various modifications may be made. For example, for the configuration and placing method of the photodetector for detecting the reflected light from the reflection filter, various configurations other than the configuration example shown in FIGS. 11 and 12 may be used. For example, as shown in FIGS. 3A and 3B, a configuration may be used in which the photodetector array is placed on a submount substrate.

INDUSTRIAL APPLICABILITY

The optical waveguide module according to the present invention is applicable as an optical waveguide module capable of enhancing the monitoring characteristics for the signal light with influence of extra scattered light being reduced. More specifically, according to the optical waveguide module having a configuration where part of the signal light is reflected by the reflection filter placed inside the groove traversing the optical waveguides for use in monitoring the light intensity, and where the groove for inserting the reflection filter is formed with material having a refractive index substantially identical to that of the core of the optical waveguide and the filter fixing resin, the configuration and manufacturing process of the optical circuit are simplified. Furthermore, generation of extra scattered light inside the groove is reduced because reflection of light is inhibited at various regions such as the inner wall portion of the groove formed in the optical circuit including the optical waveguides, the filter fixing resin, and their interfaces. Therefore, an optical waveguide module capable of enhancing the monitoring characteristics for the signal light is obtained.

Moreover, according to the optical waveguide module having a configuration where part of the signal light is reflected by the reflection filter placed inside the groove traversing the optical waveguides for use in monitoring the light intensity, and where the filter fixing resin filling the groove for inserting the reflection filter is formed with resin material having a higher refractive index than that of the core of the optical waveguide, the configuration and manufacturing process of the optical circuit are simplified. Furthermore, confinement and diffusion of extra scattered light inside the groove are inhibited because the scattered light generated inside the groove is actively emitted outside. Therefore, influence of the extra scattered light is reduced and the optical waveguide module capable of enhancing the monitoring characteristics for the signal light is obtained.

Such an optical waveguide module is applicable as a signal light intensity monitor to be inserted in an optical circuit composed of optical fibers, planar optical waveguides and the like. It may be provided in various predefined regions in an optical circuit such as an optical multiplexer, optical demultiplexer and optical attenuator to make a configuration for monitoring the signal light intensity in the optical circuit.

The invention claimed is:

1. An optical waveguide module comprising:
an optical circuit configured to include a substrate and an optical waveguide provided on said substrate, and having a groove formed to traverse a predetermined position of said optical waveguide;
a reflection filter, placed inside said groove of said optical circuit to span a region through which signal light propagated in said optical waveguide passes, for reflecting part of said signal light at a predetermined reflectance;
filter fixing resin for fixing said reflection filter by filling at least inside of said groove for seal thereof; and
a photodetector for detecting reflected light which is part of said signal light reflected by said reflection filter, wherein
said filter fixing resin is formed with resin material having a higher refractive index than that of a core of said optical waveguide with respect to said signal light having a wavelength within a predetermined signal light wavelength band.

2. The optical waveguide module according to claim 1, further comprising one or more resin layers formed with resin material having a higher refractive index than that of said filter fixing resin outside said filter fixing resin.

3. The optical waveguide module according to claim 1, wherein said optical waveguide of said optical circuit comprises an optical fiber fixed on said substrate, and fiber fixing resin for fixing said optical fiber is formed with resin material having a refractive index substantially identical to that of said filter fixing resin.

4. The optical waveguide module according to claim 1, wherein said filter fixing resin is formed with resin material which does not contain particles of dimensions substantially identical to a waveguide in said signal light wavelength band.

5. The optical waveguide module according to claim 1, wherein said groove of said optical circuit is formed obliquely at a predetermined tilt angle θ (0°<θ) relative to a vertical axis orthogonal to an optical axis of said optical waveguide.

* * * * *